(12) United States Patent
Yokote et al.

(10) Patent No.: US 9,137,478 B2
(45) Date of Patent: Sep. 15, 2015

(54) TELEVISION APPARATUS AND ELECTRONIC DEVICE

(75) Inventors: Satoshi Yokote, Ome (JP); Yoshihiko Shinozaki, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 493 days.

(21) Appl. No.: 13/008,816

(22) Filed: Jan. 18, 2011

(65) Prior Publication Data

US 2011/0285926 A1    Nov. 24, 2011

(30) Foreign Application Priority Data

May 21, 2010    (JP) .................................. 2010-117413

(51) Int. Cl.
  *H04N 5/64* (2006.01)
  *G06F 1/16* (2006.01)

(52) U.S. Cl.
  CPC .............. *H04N 5/64* (2013.01); *G06F 1/1601* (2013.01); *G06F 1/1607* (2013.01); *G06F 1/1637* (2013.01); *G06F 1/1684* (2013.01)

(58) Field of Classification Search
  CPC ... G06F 1/1601; G06F 1/1607; G06F 1/1637; G06F 1/1684; H04N 5/64
  USPC ........................................................ 348/841
  See application file for complete search history.

(56) References Cited

U.S. PATENT DOCUMENTS

| | | | |
|---|---|---|---|
| 6,037,954 A * | 3/2000 | McMahon | 345/169 |
| 6,529,185 B1 * | 3/2003 | Armstrong | 345/159 |
| 6,728,519 B1 | 4/2004 | Okuda | |
| 7,522,231 B2 * | 4/2009 | Cao | 349/58 |
| 2004/0095339 A1 * | 5/2004 | Gothard | 345/204 |
| 2006/0209012 A1 * | 9/2006 | Hagood | 345/109 |
| 2009/0174825 A1 * | 7/2009 | Yee et al. | 348/801 |
| 2009/0244025 A1 | 10/2009 | Hirota | |

FOREIGN PATENT DOCUMENTS

| | | |
|---|---|---|
| JP | H02-087334 U | 7/1990 |
| JP | H09-147671 | 6/1997 |
| JP | 2001-102763 A | 4/2001 |
| JP | 2001-175608 | 6/2001 |
| JP | 2002-056741 A | 2/2002 |
| JP | 2005-258666 | 9/2005 |

(Continued)

OTHER PUBLICATIONS

"Prior Art Information Sheet for Submitting IDS," undated.

(Continued)

*Primary Examiner* — Jessica M Prince
(74) *Attorney, Agent, or Firm* — Knobbe, Martens, Olson & Bear LLP

(57) ABSTRACT

According to one embodiment, a television apparatus includes a panel unit, a support base, a plurality of slide support mechanisms, and an operation mechanism. The panel unit includes a front panel arranged in front of a display panel and a periphery member arranged in at least part of the periphery of the front panel. The support base supports the display panel. The slide support mechanisms are attached to the support base to slidably support the panel unit. The operation mechanism is attached to the periphery member. The operation mechanism includes a movable portion capable of rotating relative to the periphery member, and receives operation from the front side.

9 Claims, 16 Drawing Sheets

(56) References Cited

FOREIGN PATENT DOCUMENTS

| | | | |
|---|---|---|---|
| JP | 2008-046817 | * | 2/2008 |
| JP | 2008-046817 A | | 2/2008 |
| JP | 2009-244989 | | 10/2009 |
| JP | 2009-272258 | | 11/2009 |

OTHER PUBLICATIONS

Notice of Rejection mailed by the Japan Patent Office on Jun. 21, 2011 in the corresponding Japanese patent app. No. 2010-117413 in 4 pages.

* cited by examiner

US 9,137,478 B2

TELEVISION APPARATUS AND ELECTRONIC DEVICE

CROSS-REFERENCE TO RELATED APPLICATIONS

This application is based upon and claims the benefit of priority from Japanese Patent Application No. 2010-117413, filed on May 21, 2010, the entire contents of which are incorporated herein by reference.

FIELD

Embodiments described herein relate generally to a television apparatus and an electronic device.

BACKGROUND

There have been known a television apparatus provided with a protection panel as a front panel in front of a display panel. The protection panel is slidably supported by the housing through a ring-like insulator arranged along the periphery of the protection panel.

If this type of electronic device has a press button mechanism that can be operated from the front side of the front panel, and if a press button as a main part of the press button mechanism is located on the housing, it is difficult to ensure reliable pressing operation because the front panel is slidable with respect to the housing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings. In general, according to one embodiment, a television apparatus comprises a panel unit, a support base, a plurality of slide support mechanisms, and an operation mechanism. The panel unit comprises a front panel and a periphery member. The front panel is configured to be arranged in front of a display panel. The periphery member is configured to be arranged in at least part of the periphery of the front panel. The support base is configured to support the display panel. The slide support mechanisms are configured to be attached to the support base to slidably support the panel unit. The operation mechanism is configured to be attached to the periphery member. The operation mechanism comprises a movable portion configured to be capable of rotating relative to the periphery member, and configured to receive operation from the front side.

According to another embodiment, an electronic device comprises a panel unit, a support base, a plurality of slide support mechanisms, and an operation mechanism. The panel unit comprises a front panel and a periphery member. The front panel is configured to be arranged in front of a display panel. The periphery member is configured to be arranged in at least part of the periphery of the front panel. The support base is configured to support the display panel. The slide support mechanisms are configured to be attached to the support base to slidably support the panel unit. The operation mechanism is configured to be attached to the periphery member. The operation mechanism comprises a movable portion configured to be capable of rotating relative to the periphery member, and configured to receive operation from the front side.

Figure 1:
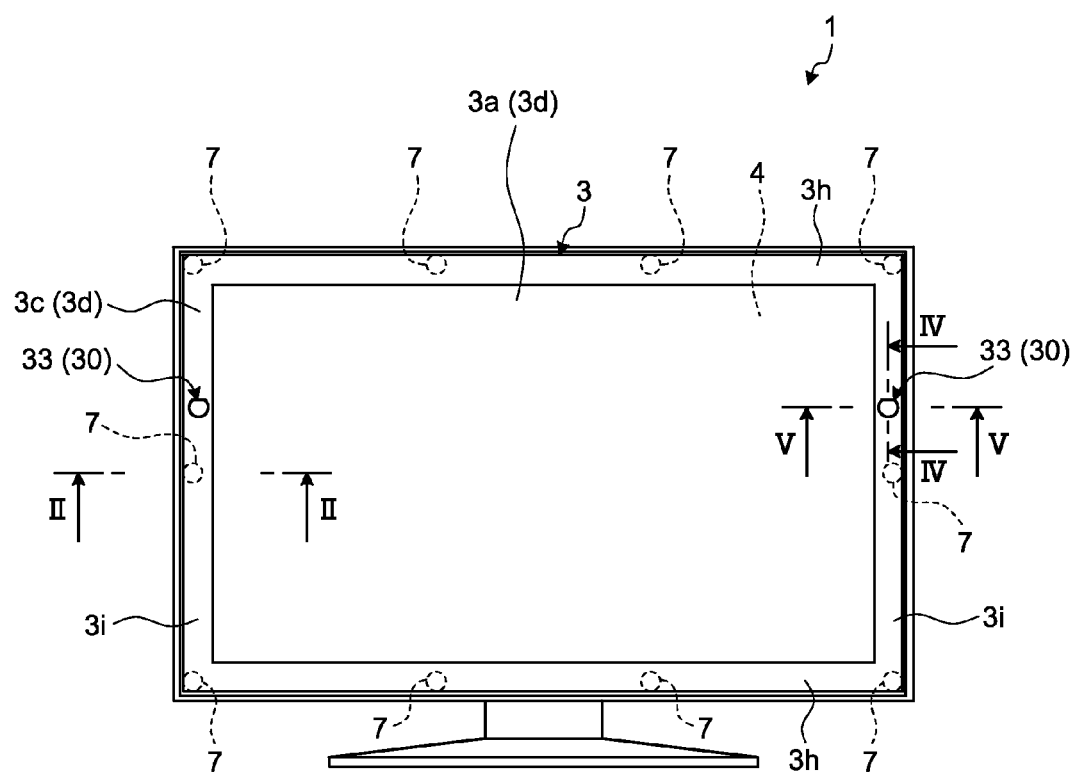
FIG. 1 is an exemplary front view of a television apparatus according to a first embodiment.
Figure 2:
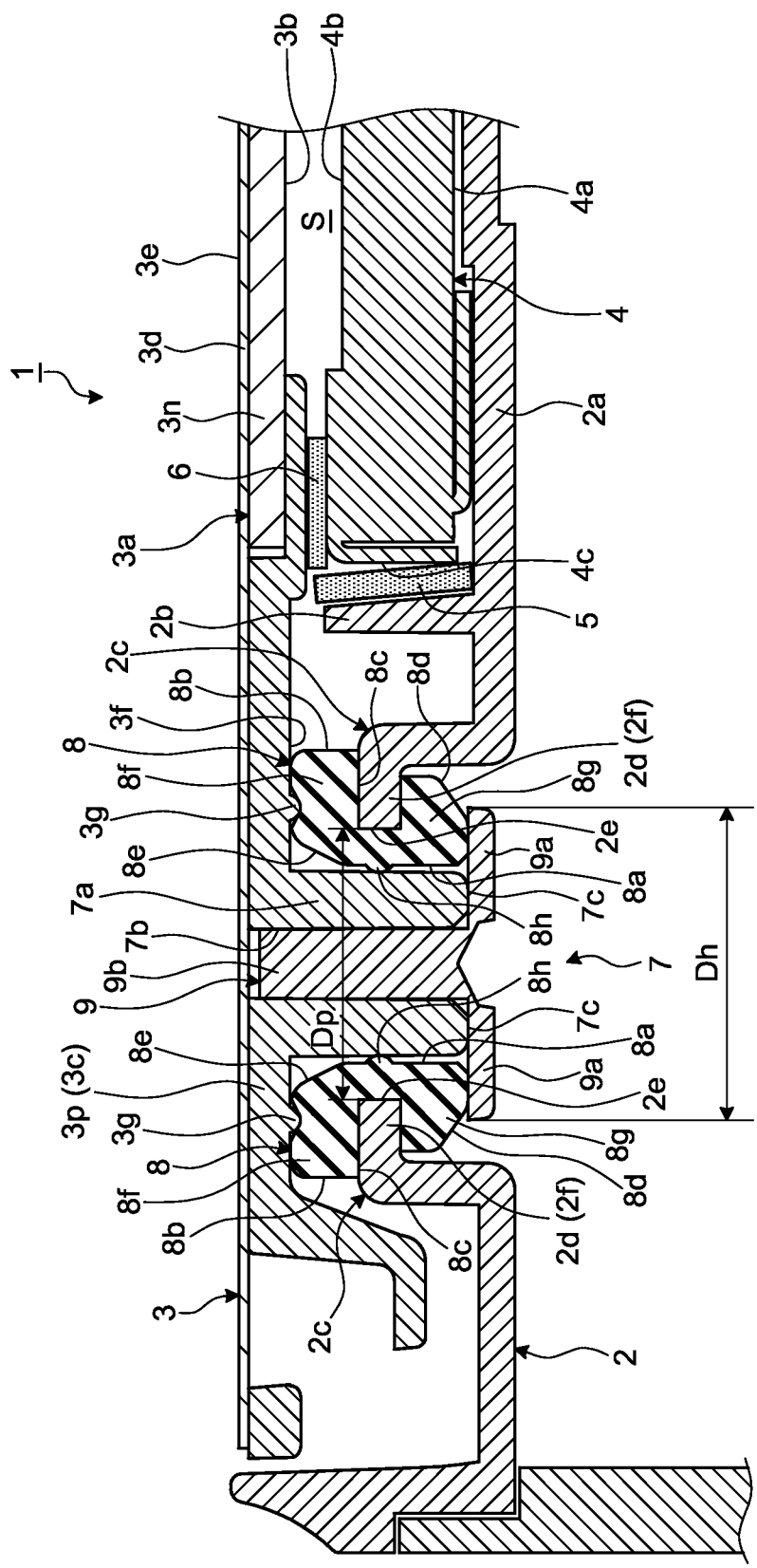
FIG. 2 is an exemplary cross-sectional view taken along line II-II of FIG. 1 in the first embodiment.

As illustrated in FIG. 1, a television apparatus 1 according to a first embodiment has a rectangular appearance in a front view (a plan view of the front surface). The television apparatus 1 comprises a housing 2 and a touch panel 3a slidably supported by the housing 2. As illustrated in FIG. 2, the touch panel 3a has a back surface 3b. On the side of the back surface 3b (lower side in FIG. 2), a display panel 4 such as a liquid crystal display (LCD) panel is located as a display device. The display panel 4 has a back surface 4a. On the side of the back surface 4a, the housing 2 is located. The display panel 4 is fixed to the housing 2 by a screw (not illustrated) or the like. In the first embodiment, the touch panel 3a corresponds to a front panel (a panel unit), while the housing 2 corresponds to a support base (supporting member).

As illustrated in FIGS. 1 and 2, a rectangular frame 3c are arranged along the periphery of the rectangular sheet-like touch panel 3a. The frame 3c is made of a synthetic resin material, a metal material, or the like. The touch panel 3a and the frame 3c are attached to a transparent cover 3d by double-sided tape (not illustrated), adhesive, or the like. The cover 3d is made of a thin sheet-like, film-like, or plate-like synthetic resin material or the like. Through the cover 3d, the touch panel 3a is integrated with the frame 3c. A periphery 3n of the touch panel 3a is located between the frame 3c and the cover 3d. The periphery of the cover 3d is painted black or the like, and prevents the periphery 3n of the touch panel 3a and the frame 3c from being exposed on the side of a front surface 3e of a touch panel unit 3 (upper side in FIG. 2). In the first embodiment, the touch panel unit 3, as a panel unit, comprises the touch panel 3a, the frame 3c, and the cover 3d.

As illustrated in FIG. 2, the housing 2 comprises a rectangular plate-like bottom wall 2a and a plurality of vertical walls 2b. The display panel 4 is mounted on the bottom wall 2a. The vertical walls 2b extend from the bottom wall 2a toward the front side (upper side in FIG. 2) and face a side surface 4c of the display panel 4. In the first embodiment, the vertical walls 2b are arranged partly spaced apart along the periphery (the side surface 4c) of the display panel 4. The vertical walls 2b function as a positioning member to attach the display panel 4 to the housing 2 or a shock or energy absorbing member for a shock load acting in the horizontal direction (the left-right direction in FIG. 2) on the display panel 4 and the like. An elastic member 5 such as elastomer, sponge, or the like is located between the side surface 4c of the display panel 4 and the vertical walls 2b. The elastic member 5 prevents the shaky movement of the display panel 4 as well as increasing energy or shock absorbing performance.

The display panel 4 is formed into a flat rectangular parallelepiped shape. The display panel 4 receives a video signal from a video signal processing circuit in a control circuit comprising an electronic component or the like mounted on a circuit board (all not illustrated), thereby displaying video including a still image and a moving image. The light representing video displayed on a front surface 4b of the display panel 4 as a display screen passes through the clear and colorless touch panel 3a and is emitted forward. The control circuit of the television apparatus 1 comprises, in addition to the video signal processing circuit, a tuner, a high-definition multimedia interface (HDMI), a signal processor, an audio/video (AV) input terminal, a remote control signal receiver, a controller, a selector, an on-screen display interface, a storage module such as a read only memory (ROM), a random access memory (RAM), and a hard disk drive (HDD), and an audio signal processing circuit (all not illustrated). The television apparatus 1 further comprises a built-in amplifier, speaker, and the like (all not illustrated) for outputting audio.

The touch panel 3a comprises two transparent conductive film adhering each other (not illustrated). The touch panel 3a is conducted at a position pressed by a finger or a stylus, thereby detecting the pressed position. A signal indicating the position pressed on the touch panel 3a is sent to the controller described above. The controller operates according to the signal.

The television apparatus 1 of the first embodiment comprising an excitation mechanism (not illustrated). The excitation mechanism comprises, for example, a motor and an eccentric weight rotated by the motor. The excitation mechanism is attached to a back surface 3f of a rectangular frame-like and plate-like front wall 3p of the frame 3c. The controller of the television apparatus 1 activates the excitation mechanism when the touch panel 3a is pressed and, for example, vibrates the touch panel unit 3. Accordingly, the operator (user) feels the vibration through his/her finger or a stylus pressing the touch panel 3a, which allows him/her to recognize that the pressing operation has been received.

A strip-like sealing member 6 is arranged along the periphery of the front surface 4b of the display panel 4 between the front surface 4b of the display panel 4 and the back surface 3f of the frame 3c. The sealing member 6 is made of a soft flexible material such as sponge, and prevents foreign matter from getting from the outside into a space S between the front surface 4b of the display panel 4 and the back surface 3b of the touch panel 3a. A repulsive force of the sealing member 6 is set to low to affect the slide or vibration of the touch panel unit 3 as little as possible. That is, the sealing member 6 hardly contributes to the support of the touch panel unit 3 by the housing 2.

The touch panel unit 3 as a front panel is, as illustrated in FIGS. 1 and 2, slidably supported by the housing 2 as a support base through a plurality of slide support mechanisms (combining mechanisms) 7. Relative to the housing 2, the touch panel unit 3 can slide in the front-back direction (a direction perpendicular to the front surface 3e, the vertical direction in FIG. 2) and the horizontal direction (a direction along the front surface 3e, the left-right direction in FIG. 2 and a direction perpendicular to the paper surface). The slide support mechanisms 7 are arranged along the periphery of the touch panel unit 3, preferably, in symmetry with respect to at least one of the two center lines parallel to the four sides of the rectangular touch panel 3a in a front view. The slide support mechanisms 7 are arranged at least four positions, and supports the frame 3c of the touch panel unit 3.

In the first embodiment, as illustrated in FIG. 2, the slide support mechanisms 7 each comprise a support bracket 2c provided to the housing 2, an elastic bush 8 attached to the support bracket 2c, a through hole 8a formed in the elastic bush 8 as a through portion, a combining portion 7a that passes through the through hole 8a, and a screw 9 configured to be combined with the combining portion 7a as a combined member. In the first embodiment, the support bracket 2c corresponds to a base. The frame 3c corresponds to a periphery member, while the front wall 3p of the frame 3c corresponds to a supported member.

The support bracket 2c is provided as a boss that cylindrically protrudes forward, i.e., toward the front wall 3p as a supported member at the periphery of the bottom wall 2a of the housing 2. A circular through hole 2e is formed in the center of a top wall 2d of the support bracket 2c. An inward-looking flange 2f is formed around the through hole 2e.

Figure 3:
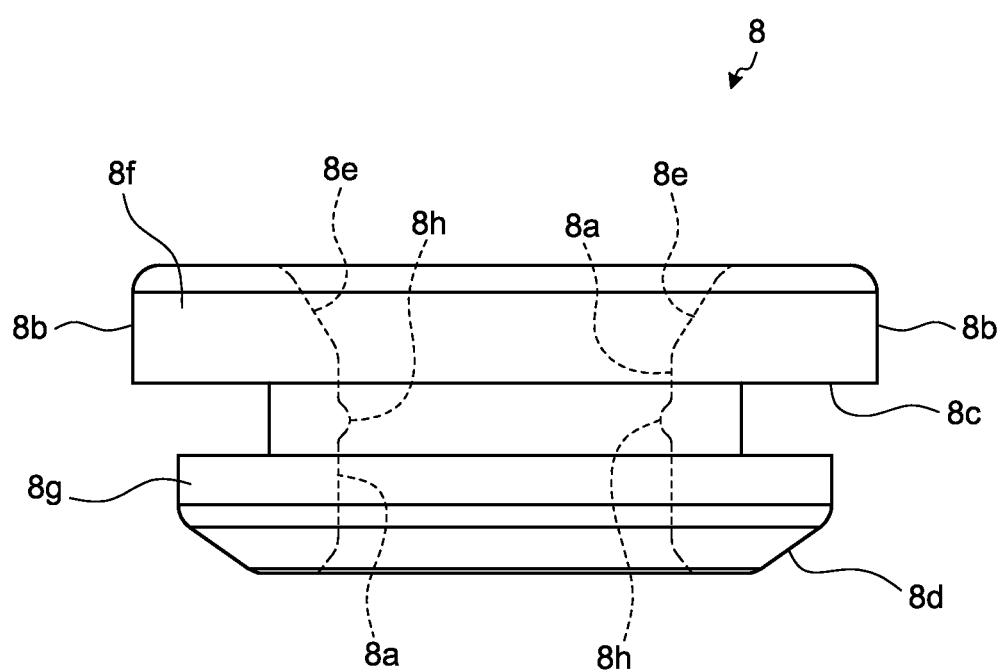
FIG. 3 is an exemplary side view of an elastic bush of the television apparatus in the first embodiment.

The elastic bush 8 is made of an elastic material such as elastomer (for example, synthetic rubber) or the like softer and more flexible than the housing 2, the frame 3c (the combining portion 7a), and the like, and formed in a cylindrical shape. As illustrated in FIGS. 2 and 3, an outer circumference groove 8c is formed in the center of an outer circumference surface 8b in the axial direction (the vertical direction in FIGS. 2 and 3). The outer circumference groove 8c extends all over the outer circumference. The flange 2f of the support bracket 2c is fitted in the outer circumference groove 8c, and thereby the elastic bush 8 is attached to the support bracket 2c.

The elastic bush 8 is elastically deformed. Accordingly, the operator can relatively easily attach the elastic bush 8 to the support bracket 2c by inserting the elastic bush 8 into the through hole 2e from the front side. One side of the elastic bush 8 is asymmetric with the other in the axial direction. This prevents the operator from erroneously assembling the elastic bush 8 with the support bracket 2c. As illustrated in FIGS. 2 and 3, a tapered surface 8d that tapers outward is formed at the periphery of the end of the elastic bush 8 on the side of a head 9a of the screw 9. The tapered surface 8d functions as a guide for inserting the elastic bush 8 into the through hole 2e. Further, as illustrated in FIGS. 2 and 3, a tapered surface 8e that tapers inward is formed at the end of the through hole 8a on the support bracket 2c side. The tapered surface 8e functions as a guide for inserting the combining portion 7a into the through hole 8a. The tapered surface 8e prevents the elastic bush 8, which is pushed when the combining portion 7a is inserted into the through hole 8a, from being wrongly assembled.

The combining portion 7a is formed as a boss cylindrically protruding backward from the frame 3c. As illustrated in FIG. 2, when assembled, the combining portion 7a passes through the through hole 2e of the support bracket 2c and protrudes on the back side (back surface side) of the support bracket 2c. A female screw hole 7b is formed in the combining portion 7a as a female screw portion. The female screw hole 7b opens backward. While, in the first embodiment, the female screw hole 7b is formed as a through hole passing through from the front to the back of the front wall 3p of the frame 3c, it may be formed as a bottomed hole that opens only backward.

The screw 9 comprises the head 9a and a male screw portion 9b threadedly engaged with the female screw hole 7b. The screw 9 is inserted until the head 9a comes in contact with an end 7c of the combining portion 7a.

The operator assembles the elastic bush 8 with the support bracket 2c from the front side, and brings the touch panel unit 3 close to the housing 2 from the front side to insert the combining portion 7a into the through hole 8a of the elastic bush 8. Then, the operator screws the screw 9 into the female screw hole 7b of the combining portion 7a as a boss from the back side, and thereby the slide support mechanisms 7 as illustrated in FIG. 2 are formed. That is, the elastic bush 8 is configured to be fitted with the support bracket 2c. Thus, the operator can perform the assembly work easily and smoothly compared to the case where an elastic member is adhered or screwed.

In the first embodiment, the combining portion 7a passes through the through hole 8a of the elastic bush 8 in the front-back direction of the display panel 4. Accordingly, the operator can insert the combining portion 7a into the through hole 8a by stacking or overlapping the display panel 4 and the touch panel unit 3. Thus, the operator can perform the assembly work more easily and smoothly.

In the first embodiment, as illustrated in FIG. 2, when the slide support mechanisms 7 are assembled, a front-side extension portion 8f the elastic bush 8 is located between the support bracket 2c as part of the housing 2 and the frame 3c of the touch panel unit 3 in front thereof, and also a back-side extension portion 8g of the elastic bush 8 is located between the support bracket 2c and the screw 9 in the back thereof. That is, the repulsive force of the elastic bush 8 can easily be equally acted with respect to both force (external force, inertial force, etc.) acting from the front to the back of the touch panel unit 3 and force acting from the back to the front. This facilitates to prevent the variation in forward and backward slide (vibration) of the touch panel unit 3. In addition, the elastic bush 8 is arranged to surround the combining portion 7a, which prevents the variation in the horizontal slide characteristic (vibration characteristic) of the touch panel unit 3. From the view of easy slide (vibration), the initial load (the load when no external force except the own weight is acting) on the front-side extension portion 8f and the back-side extension portion 8g by holding the members is preferably set to relatively low.

In the first embodiment, the support bracket 2c is formed as a boss that protrudes forward (i.e., toward the front wall 3p of the frame 3c) from the bottom wall 2a of the housing 2. This prevents the slide support mechanisms 7 from protruding backward from the bottom wall 2a and facilitates to house the slide support mechanisms 7 in the housing 2. Besides, the held elastic bush 8 comes in contact with the front wall 3p of the frame 3c as a base. This eliminates the need to provide the frame 3c with a portion where the elastic bush 8 comes in contact separately from the front wall 3p, and simplifies the structure of the slide support mechanisms 7.

In the slide support mechanisms 7 configured as above, as the contact area between the touch panel unit 3 and the elastic bush 8 increases, the touch panel unit 3 is less likely to vibrate. Thus, the first embodiment provides a structure that reduces the contact area between the touch panel unit 3 and the elastic bush 8 when assembled. For example, a ring-like protrusion 8h is provided on the inner surface of the through hole 8a of the elastic bush 8. The protrusion 8h reduces the contact area between the inner surface of the through hole 8a and the outer surface of the combining portion 7a. For another example, a plurality of protrusions 3g are arranged in a circle at a portion where the back surface 3f of the frame 3c faces the elastic bush 8. The protrusions 3g reduce the contact area between the back surface 3f of the frame 3c and the front surface of the elastic bush 8. These are described by way of example only, and a protrusion may be provided to the combining portion 7a or the front surface of the elastic bush 8. Such a protrusion may be formed in a ring shape, or a plurality of protrusions may be arranged in a circle.

In the first embodiment, the outer diameter Dh of the head 9a is larger than the inner diameter Dp of the through hole 2e of the support bracket 2c. Accordingly, even if the elastic bush 8 cannot be assembled by error or comes off from the support bracket 2c by time degradation or the like, the screw 9 is prevented from coming off from the through hole 2e of the support bracket 2c. This prevents the touch panel unit 3 from coming off from the housing 2. A washer (not illustrated) may be arranged between the head 9a and the elastic bush 8. The washer prevents the elastic bush 8 from twisting upon screwing the screw 9. In this case, the washer is provided with an outer diameter larger than the inner diameter Dp of the through hole 2e.

In the first embodiment, a press button mechanism 30 is exposed on the front surface of the touch panel unit 3 slidably supported by the housing 2. The press button mechanism 30 comprises a cover 33 as a movable member that can move relative to the frame 3c, and is pressed from the front side.

In the first embodiment, as illustrated in FIG. 1, the press button mechanism 30 is provided to each of a pair of strip-like vertical portions 3i extending along the vertical direction on the left and the right of the frame 3c. The press button mechanism 30 is located between a plurality (two in the first embodiment) of support points of the frame 3c by the slide support mechanisms 7.

Figure 4:
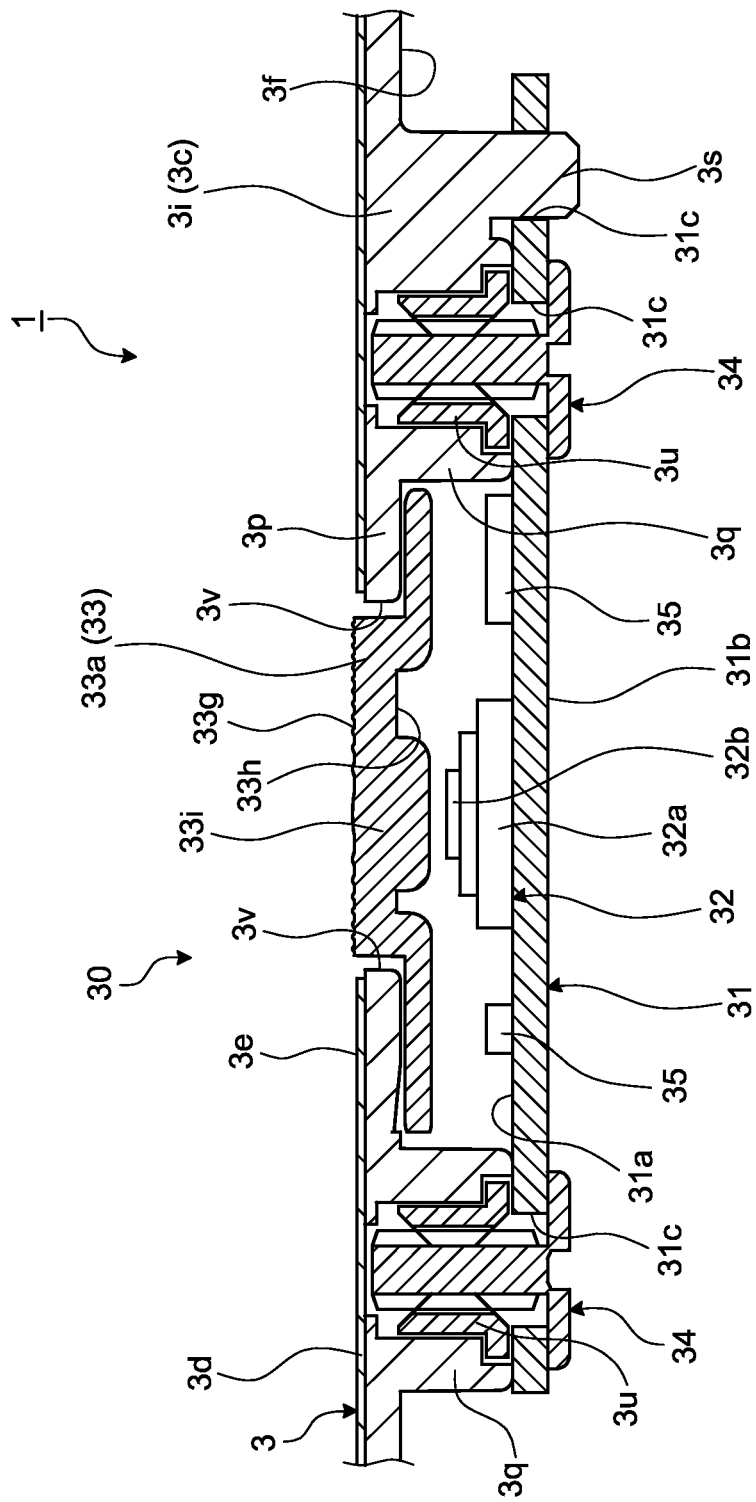
FIG. 4 is an exemplary cross-sectional view taken along line IV-IV of FIG. 1 in the first embodiment.
Figure 5:
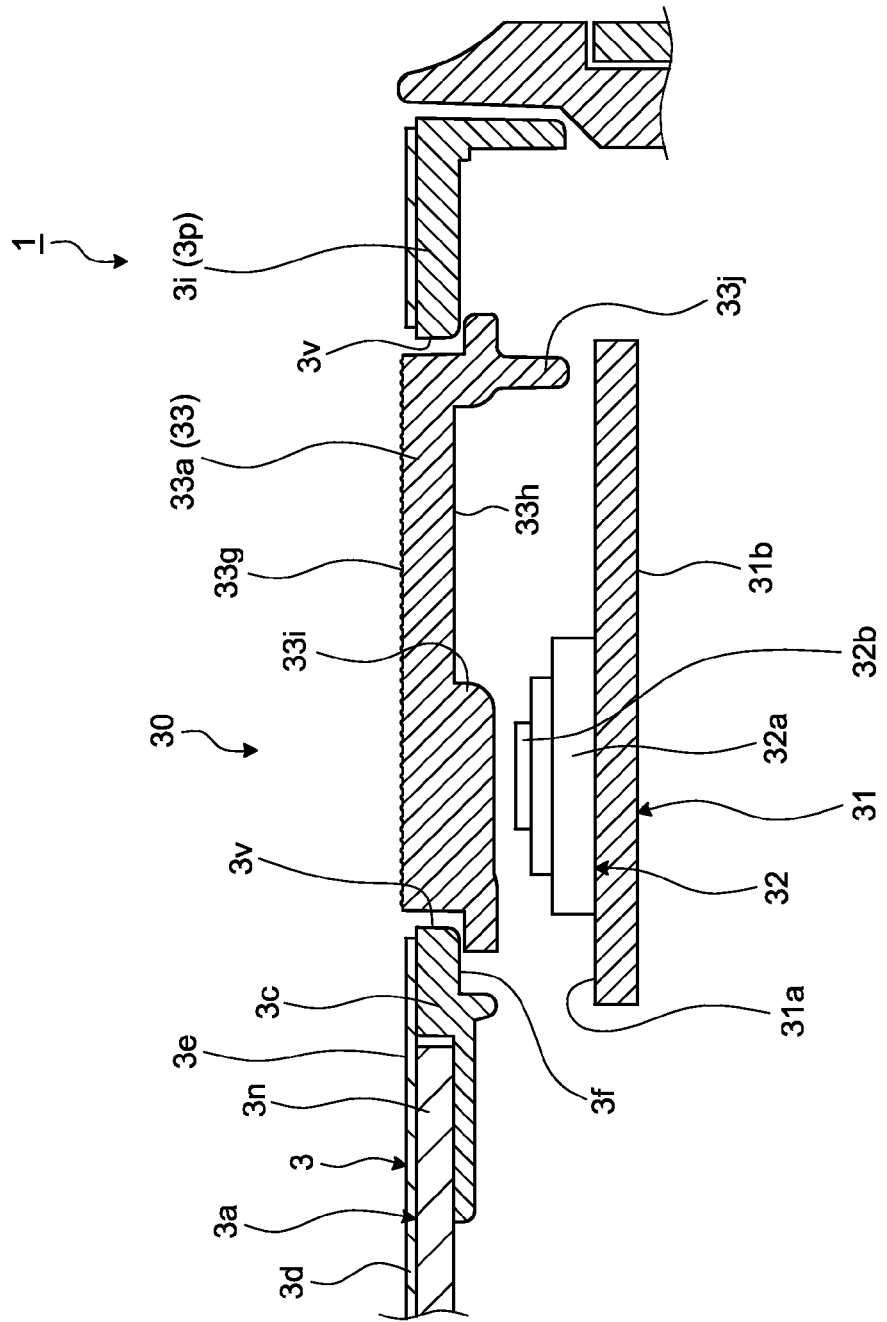
FIG. 5 is an exemplary cross-sectional view taken along line V-V of FIG. 1 in the first embodiment.

As illustrated in FIGS. 4 and 5, the press button mechanism 30 comprises a circuit board 31 as an operation mechanism support member, a press button 32 as an operation mechanism main body attached to the circuit board 31, and the cover 33 that covers the press button 32.

The circuit board 31 is located behind the front wall 3p of the frame 3c in parallel thereto with a space therebetween. In other words, the circuit board 31 is arranged such that a front surface 31a faces forward, while a back surface 31b faces backward.

As illustrated in FIG. 4, bosses 3q protruding backward are provided to the front wall 3p of the frame 3c as support member fixing members. The bosses 3q are arranged spaced apart along the periphery 3n of the touch panel 3a (see FIG. 5) at a plurality of positions (in the first embodiment, two positions per the press button mechanism 30). A cylindrical female screw member 3u is attached to each of the bosses 3q by insert molding or the like. A screw 34 passing through a through hole 31c of the circuit board 31 is screwed into the female screw member 3u, thereby the circuit board 31 is fixed to each of the bosses 3q. The front wall 3p is provided with a protrusion 3s protruding backward. The through hole 31c is formed in the circuit board 31 such that the protrusion 3s passes through the through hole 31c. The protrusion 3s and the through hole 31c that the protrusion 3s passes through function as a positioning member of the circuit board 31. The protrusion 3s and the adjacent one of the bosses 3q are integrated via a rib or the like.

In the first embodiment, the circuit board 31 is configured as a printed circuit board. The press button 32, a component 35, and the like are soldered to the front surface 31a of the circuit board 31 facing the back surface 3f of the front wall 3p. The press button 32 is connected to a control circuit including a central processing unit (CPU) and the like (not illustrated) via a wiring pattern formed on the circuit board 31, a connector as the component 35 mounted on the circuit board 31, harness connected to the connector, and the like (all not illustrated).

The press button 32 comprises a main body 32a and a movable portion 32b that can protrude from and retract to the main body 32a. The movable portion 32b can protrude from and retract to the main body 32a in the front-back direction. The press button 32 comprises a pair of built-in contact points including a fixed contact point and a movable contact point (all not illustrated). When the contact points are connected, the circuit including the contact points is closed.

The cover 33 covers the front side of the press button 32 with a space therebetween. The cover 33 is made of an elastic material including elastomer, synthetic resin, and the like. The cover 33 is fixed to the back surface of the front wall 3p by, for example, welding, adhesion, or the like. A through hole 3v is formed in the front wall 3p as a through portion. An operation portion 33a of the cover 33 passes through the through hole 3v and is exposed on the front surface 3e of the touch panel unit 3. In the first embodiment, a top surface 33g of the operation portion 33a and the front surface 3e of the touch panel unit 3 are arranged to be connected with almost no unevenness. When pressed from the front by the user's finger or the like, the cover 33 is warped backward (lower side in FIGS. 4 and 5) as being elastically deformed, and the operation portion 33a is retracted from the front surface 3e. When the press is released, the operation portion 33a returns forward to be in the initial state (attached state).

As illustrated in FIG. 5, protrusions 33i and 33j are provided to a back surface 33h of the operation portion 33a. The protrusion 33i faces the movable portion 32b. The protrusion 33j faces the front surface 31a of the circuit board 31 at a position distant from the movable portion 32b. When the cover 33 is pressed, the protrusion 33i presses the movable portion 32b. The protrusion 33j comes in contact with the front surface 31a of the circuit board 31 when the user presses the operation portion 33a with his/her finger or the like at a position distant from the press button 32 (for example, the right end of the operation portion 33a in FIG. 5) and constitutes a support post. If the protrusion 33j is not present, the operation portion 33a inclined backward as separating from the press button 32, and the movable portion 32b may not be pressed straight. In the first embodiment, the protrusion 33j constitutes a support post, which prevents the inclination of the operation portion 33a. Thus, the movable portion 32b can be pressed more reliably with the operation portion 33a. In the first embodiment, the protrusion 33j corresponds to an inclination preventing member. Such a structure is effective when the operation portion 33a of the cover 33 is large with respect to the press button 32. That is, with the protrusion 33j, the press button can be smaller, and also the operation portion 33a can be larger. The inclination preventing member may be provided to the circuit board 31 as a protrusion (for example, a stud or the like).

As described above, according to the first embodiment, the press button mechanism 30 is provided to the frame 3c of the touch panel unit 3 as an operation mechanism to receive a pressing operation from the front surface 3e side. Thus, compared to the case where the press button mechanism is provided to the housing, the press button mechanism 30 can be more reliably pressed.

Especially, as in the first embodiment, when the touch panel unit 3 is vibrated by the excitation mechanism, if the press button mechanism 30 is integrated as a whole with the touch panel unit 3, the generation of vibration and sound can be reduced.

According to the first embodiment, the press button mechanism 30 is located between the support points of the frame 3c by the slide support mechanisms 7. This prevents the touch panel unit 3 from being inclined when the press button mechanism 30 is pressed, and thus the press button mechanism 30 can be more reliably pressed.

According to the first embodiment, the press button mechanism 30 comprises the circuit board 31, the press button 32, and the cover 33. The circuit board 31 is located behind the front wall 3p of the frame 3c with a space therebetween. The press button 32 is provided to the circuit board 31 and located behind the front wall 3p. The cover 33 covers the press button 32 and passes through the through hole 3v formed in the front wall 3p to be exposed on the front side of the frame 3c. Thus, using the frame 3c of the touch panel unit 3, the press button mechanism 30 can be relatively easily installed.

According to the first embodiment, the slide support mechanisms 7 comprise the elastic bush 8 having the through hole 8a and the periphery is fitted in one of the housing 2 and the touch panel unit 3 (in the first embodiment, as an example, the housing 2), and the screw 9 connected to the other one of the housing 2 and the touch panel unit 3 (in the first embodiment, as an example, the touch panel unit 3) via the combining portion 7a passing through the through hole 8a and holding the elastic bush 8 with the other one. Accordingly, the elastic bush 8 can be attached to the one of the housing 2 and the touch panel unit 3 (in the first embodiment, the housing 2) by fit connection. Thus, compared to the case where the elastic member is attached by adhesion or screwing, the operator can perform assembly work more easily and smoothly. Besides, the elastic bush 8 is arranged to surround the combining portion 7a. This prevents the variation in the slide characteristic (vibration characteristic) of the touch panel unit 3 in each direction perpendicular to the through hole 8a. Further, the elastic bush 8 supported by the one of the housing 2 and the touch panel unit 3 (in the first embodiment, the housing 2) at the periphery is held by the other one of the housing 2 and the touch panel unit 3 (in the first embodiment, the touch panel unit 3) and the screw 9 connected to the other one. Thus, the repulsive force of the elastic bush 8 can easily be equally acted with respect to both axial directions of the through hole 8a. This prevents the variation in the slide characteristic (vibration characteristic) in both the directions.

According to the first embodiment, the elastic bush 8 of the slide support mechanisms (combining mechanism) 7 has the function of preventing the touch panel unit 3 from sliding in the in-plane direction of a front surface 23e (the direction along the XY plane) and the out-of-plane direction (the direction crossing the XY plane, at least the Z direction, the front-back direction). That is, as illustrated in FIG. 2, the elastic bush 8 is arranged to cover the periphery of the flange 2f as an example of a portion integrated with the housing 2, and portions integrated with the touch panel unit 3 (for example, the front wall 3p, the combining portion 7a, and the head 9a) are arranged to cover the periphery of the elastic bush 8. Accordingly, if the touch panel unit 3 is displaced in any direction, the elastic bush 8 is present between the housing 2 and the touch panel unit 3. Thus, with the elastic bush 8 as a preventing member, it is possible to prevent the over displacement of the touch panel unit 3 or suppress the displacement within a predetermined range.

Figure 6:
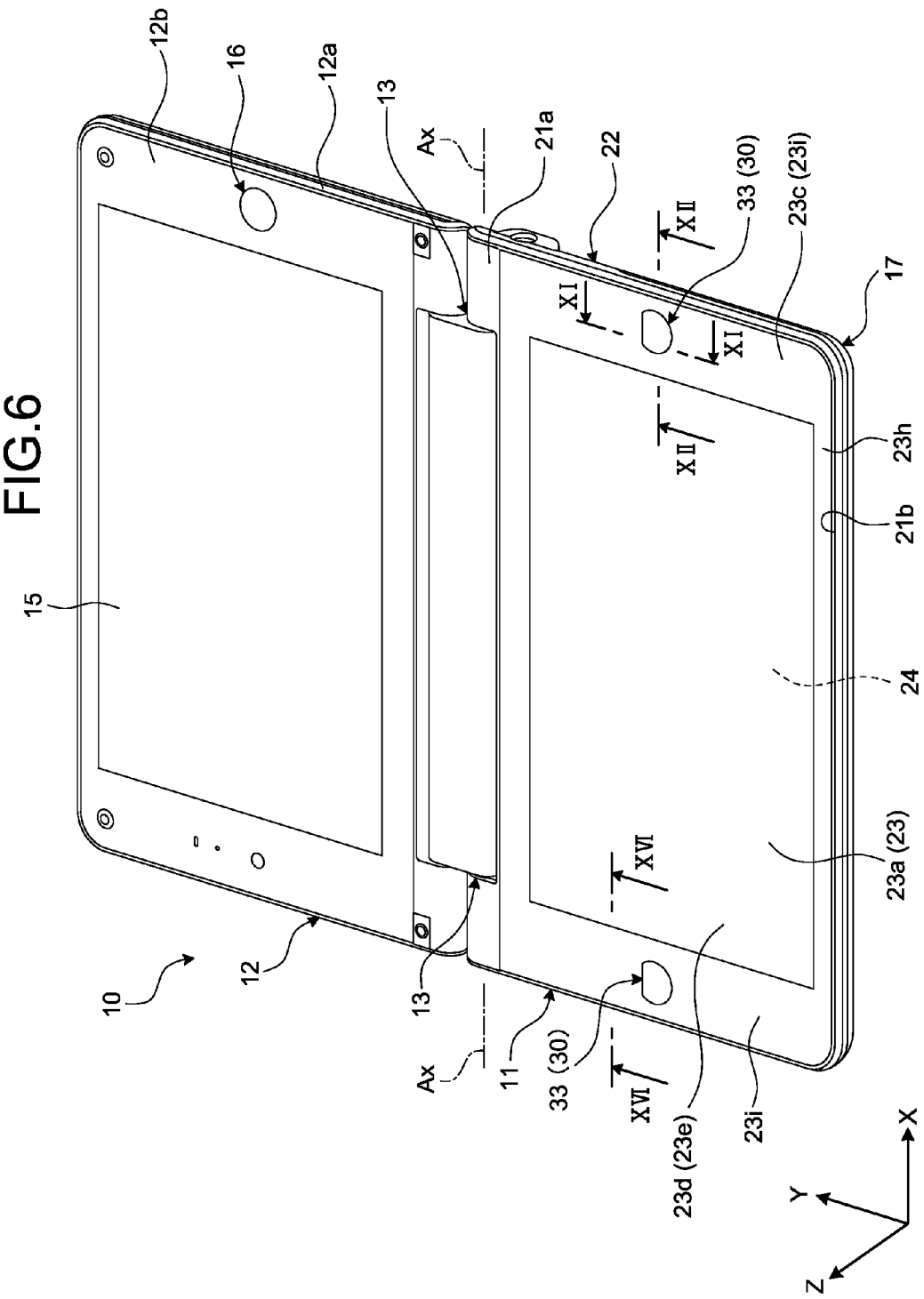
FIG. 6 is an exemplary perspective view of an electronic device according to a second embodiment.

A description will be given of an electronic device 10 according to a second embodiment. As illustrated in FIG. 6, the electronic device 10 of the second embodiment is, for example, a notebook personal computer. The electronic device 10 comprises a flat rectangular first body 11 and a flat rectangular second body 12. The first body 11 and the second body 12 are connected by a hinge mechanism 13 to be relatively rotatable about a rotation axis Ax between an open position as illustrated in FIG. 6 and a closed position (not illustrated). Hereinafter, for the sake of convenience of description, directions (X, Y, and Z directions) are defined. The X and Y directions are the directions substantially along the front surface of the first body 11. The X direction refers to the width direction of the first body 11 (the longitudinal direction of the front surface), the Y direction refers to the depth direction of the first body 11 (the short-side direction of the front surface), and the Z direction refers to the direction perpendicular to the surface of the first body 11. The X, Y, and Z directions are perpendicular to one another.

The first body 11 is provided with a'display panel 24 such as a liquid crystal display (LCD) panel as a display device provided with a touch panel 23a, the press button mechanism 30, and the like, which are exposed on a front surface 21a as the outer surface of a housing 22. On the other hand, the second body 12 is provided with a display panel 15 such as LCD panel as a display device, a pointing device 16, and the like, which are exposed on a front surface 12b as the outer surface of a housing 12a. When the first body 11 and the second body 12 are in the open position as illustrated in FIG. 6, the display panel 15, the display panel 24 with the touch panel 23a, the cover 33 of the press button mechanism 30, the pointing device 16, and the like are exposed to allow the user to use them. On the other hand, in the closed position, the front surface 21a closely faces the front surface 12b, and the display panels 15 and 24, the cover 33, the pointing device 16, and the like are covered between the housings 22 and 12a. While, in the second embodiment, the touch panel 23a will be described by way of example as being provided to only the first body 11, a touch panel may be provided to the second body 12. In the second embodiment, the touch panel 23a corresponds to a front panel, and the housing 22 corresponds to a support base.

Figure 7:
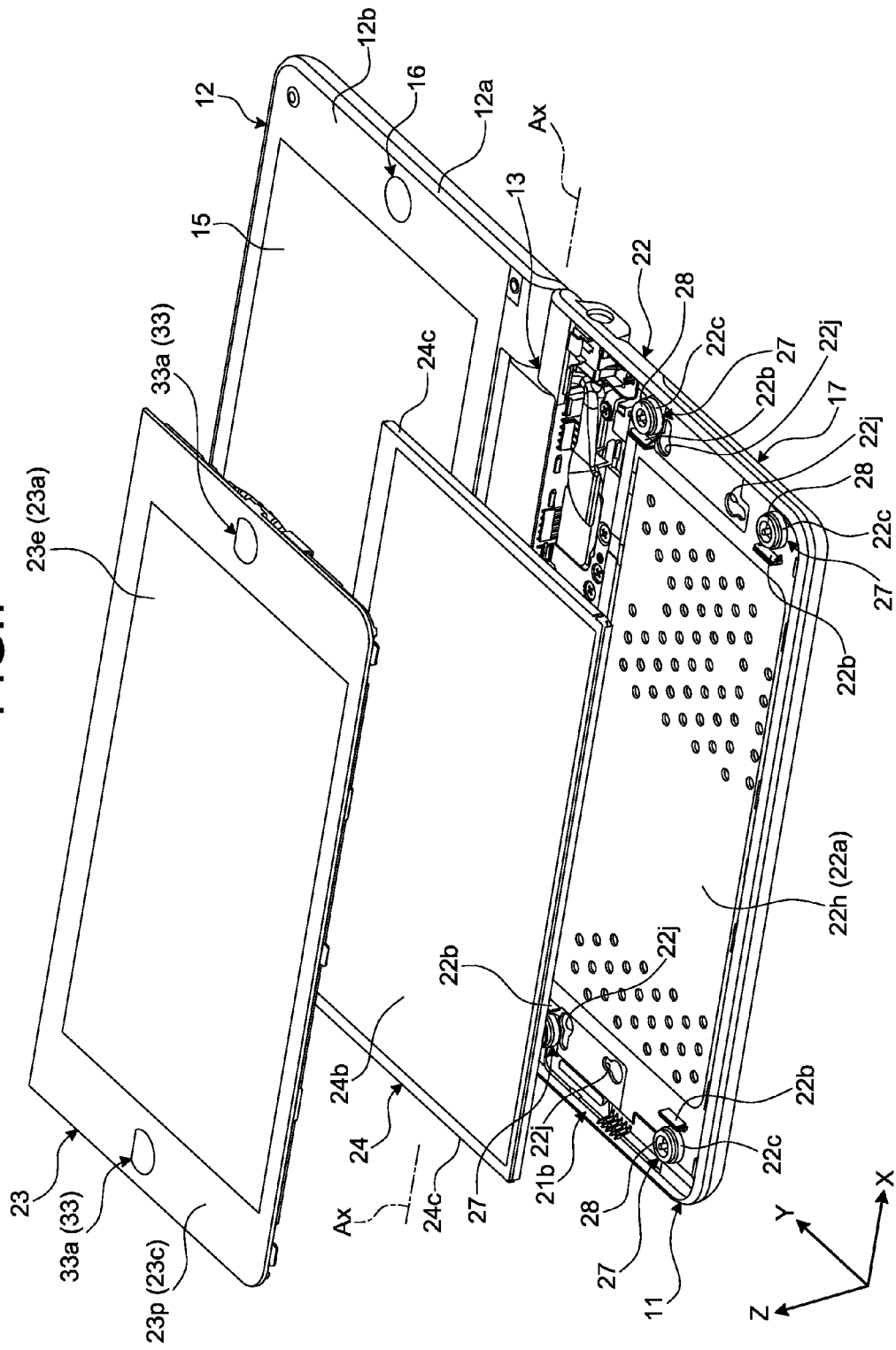
FIG. 7 is an exemplary exploded perspective view of the electronic device in the second embodiment.

As illustrated in FIG. 7, in the second embodiment, the display panel 24 is located on a bottom wall 22a of the housing 22 of the first body 11. A touch panel unit 23 is arranged on the display panel 24. In the second embodiment, the front-back direction based on the display panel 24 corresponds to the Z direction. The upper side of FIGS. 4 and 5 corresponds to the front side, and the lower side corresponds to the back side. The touch panel 23a corresponds to the panel unit.

As illustrated in FIGS. 6 and 7, the housing 22 is provided with an opening 21b that opens forward (upward in the Z direction). The opening 21b is covered with the touch panel unit 23. The first body 11 has no front wall as a wall on the front side of the housing 22 except at the periphery on the second body 12 side where part of the hinge mechanism 13 is housed. The front surface of the first body 11 is almost formed of the front surface 23e of the touch panel unit 23. Substantially a constant clearance 21c (see FIG. 16) is provided along the entire circumference of the touch panel unit 23 between the touch panel unit 23 and the opening 21b.

Figure 8:
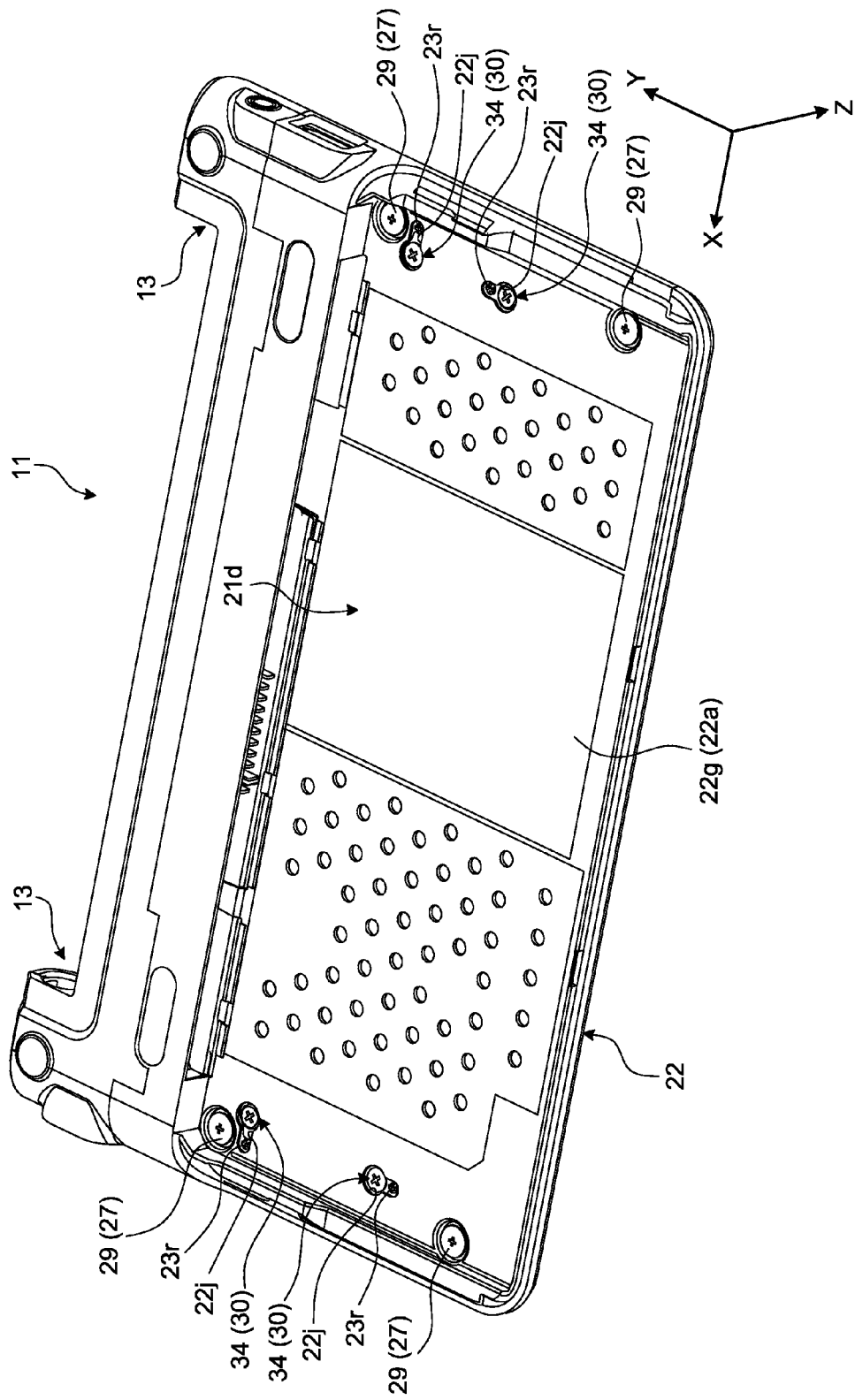
FIG. 8 is an exemplary perspective view of the back of a first body of the electronic device, from which a battery pack is removed in the second embodiment.
Figure 16:
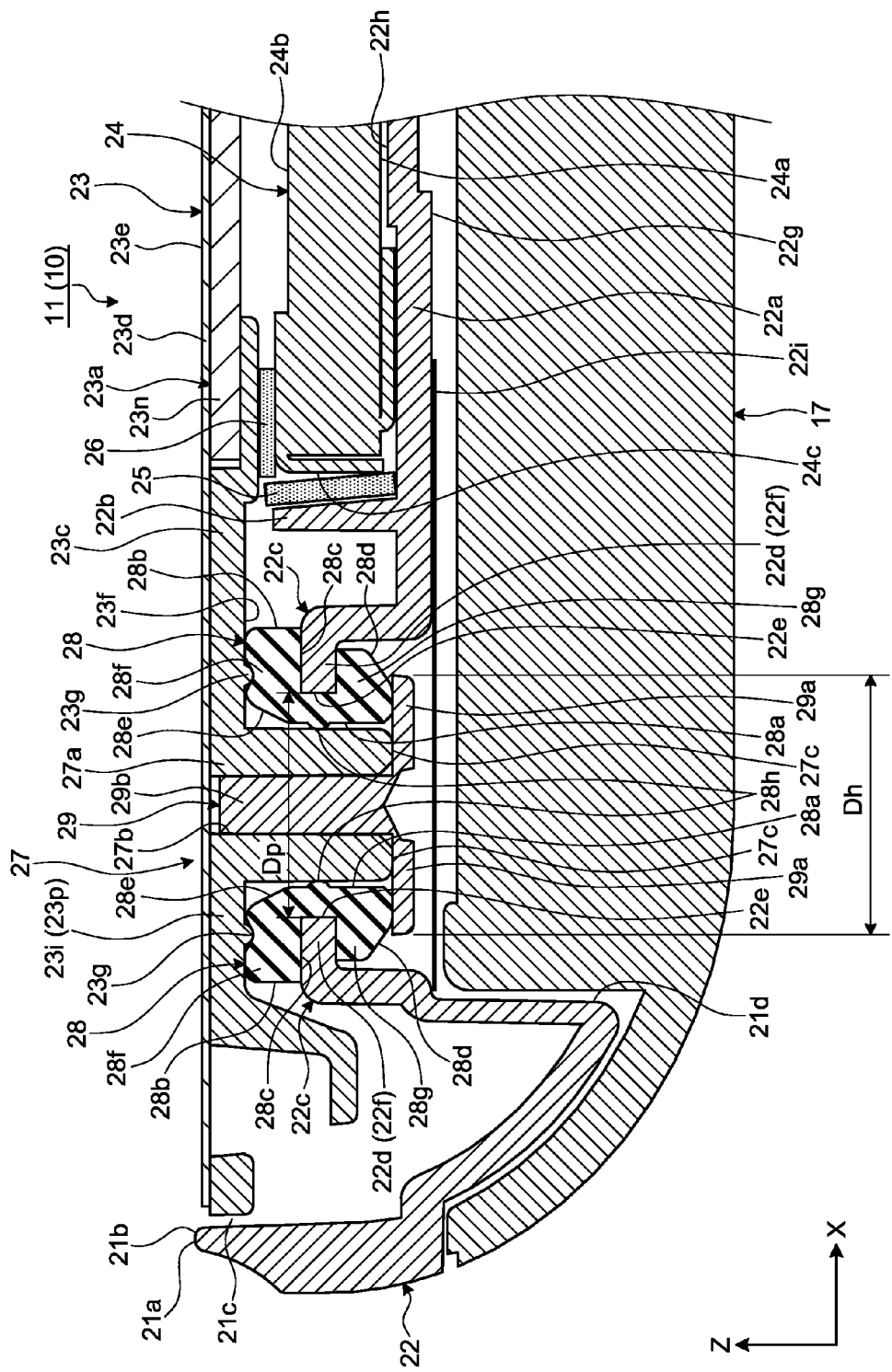
FIG. 16 is an exemplary cross-sectional view taken along line XVI-XVI of FIG. 6 in the second embodiment.

As illustrated in FIG. 8, on the back of the housing 22 of the first body 11, a recessed portion 21d, in which a flat rectangular parallelepiped battery pack 17 (see FIGS. 6, 7, 11, and 16) is fitted, is formed. The recessed portion 21d is formed on the side separate from the hinge mechanism 13, i.e., near the back in the depth direction (the Y direction). The bottom surface of the recessed portion 21d is a back surface 22g of the bottom wall 22a. That is, in the second embodiment, the bottom wall 22a of the housing 22 functions as a partition wall between an inner space of the housing 22 that houses the display panel 24 and the touch panel unit 23 and the recessed portion 21d that houses the battery pack 17. The display panel 24 is, as illustrated in FIG. 16, fixed to the bottom wall 22a facing a back surface 24a with a screw (not illustrated) or the like.

As illustrated in FIG. 7, in the bottom wall 22a, the display panel 24 is mounted on a front surface 22h. Besides, a portion where the battery pack 17 is located on the back surface 22g as illustrated in FIG. 8 protrudes more forward than a portion on the hinge mechanism 13 side as illustrated in FIG. 7. A plurality of (in the second embodiment, four) vertical walls 22b are provided to the protruding portion. The vertical walls 22b are formed as ribs having a rectangular appearance in a side view. The vertical walls 22b extend from the bottom wall 22a toward the front side (upper side in FIG. 7) and faces a side surface 24c corresponding to the short side of the display panel 24. In the second embodiment also, the vertical walls 22b function as a positioning member to attach the display panel 24 to the housing 22 or a shock or energy absorbing member for a shock load acting in the horizontal direction on the display panel 24 and the like. In the second embodiment, two of the vertical walls 22b are arranged to face the one side surface 24c corresponding to the short side, and a total of the four vertical walls 22b are provided on the bottom wall 22a.

As illustrated in FIG. 7, in the bottom wall 22a, the display panel 24 is mounted on the front surface 22h. Besides, on the front surface 22h in the portion where the battery pack 17 is located on the back surface 22g as illustrated in FIG. 8, a plurality of cylindrical bottomed support brackets 22c that constitute a slide support mechanisms 27 protrude as illustrated in FIG. 7. In the second embodiment, the support brackets 22c (in the second embodiment, four support brackets) are located outside the vertical walls 22b in the width direction. An elastic bush 28 is attached to each of the support brackets 22c.

As illustrated in FIG. 7, the display panel 24 is formed into a flat rectangular parallelepiped shape. The display panel 24 receives a display signal from a control circuit comprising an electronic component or the like mounted on a circuit board (all not illustrated), thereby displaying video including a still image and a moving image. In the second embodiment also, the light representing video displayed on a front surface 24b of the display panel 24 as a display screen passes through the clear and colorless touch panel 23a and is emitted forward. The control circuit of the electronic device 10 comprises a control module, a storage module such as ROM, RAM, and HDD, an interface circuit, and various controllers (all not illustrated). The electronic device 10 further comprises a built-in speaker (not illustrated) and the like for outputting audio.

Figure 9:
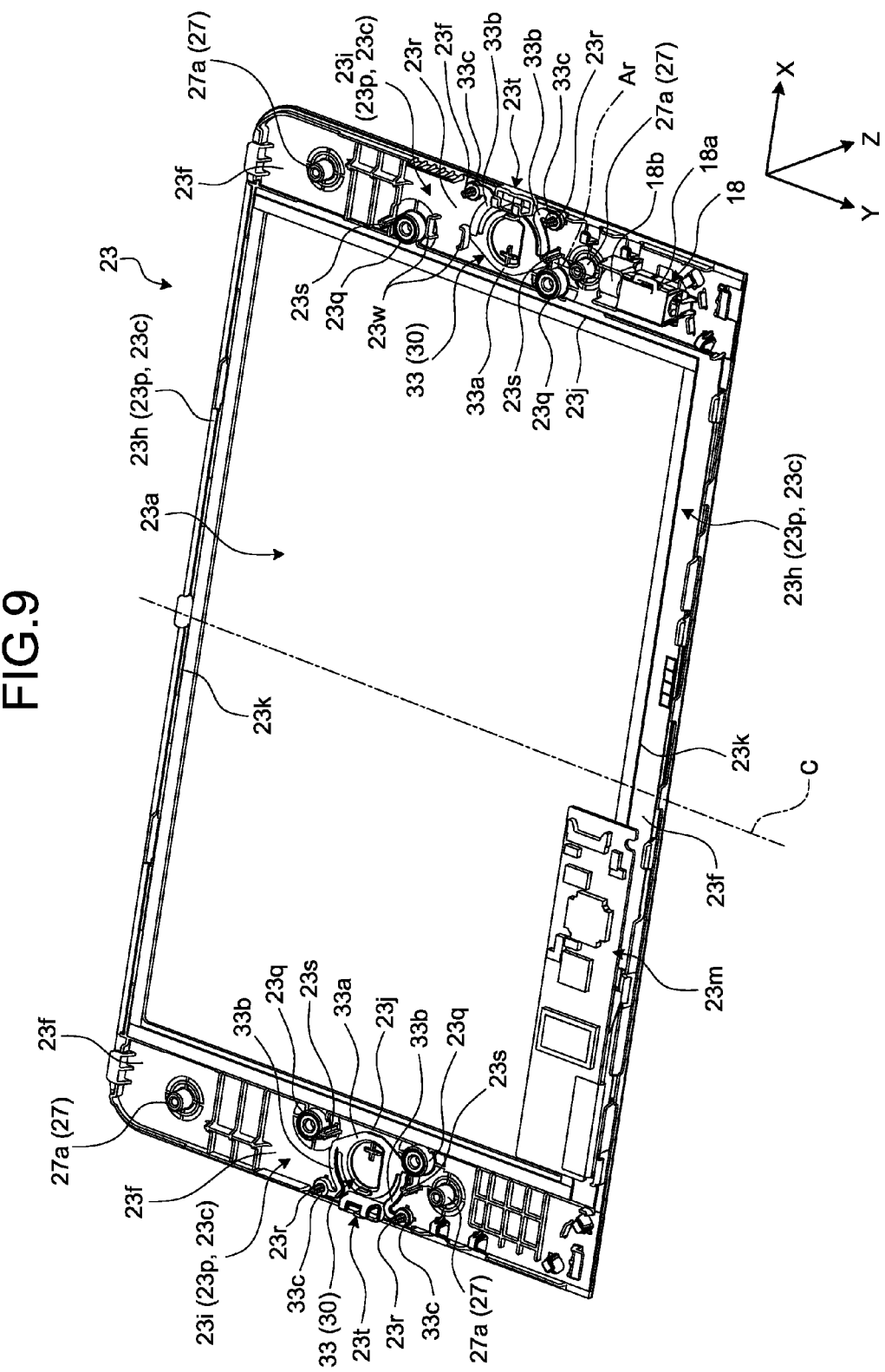
FIG. 9 is an exemplary perspective view of the back of a touch panel unit of the electronic device, from which an operation mechanism support member is removed in the second embodiment.

As illustrated in FIGS. 7 and 9, the touch panel unit 23 comprises the rectangular sheet-like touch panel 23a and the rectangular frame 23c arranged along the periphery of the touch panel 23a. The frame 23c is made of a synthetic resin material, a metal material, or the like. As illustrated in FIG. 16, the touch panel 23a and the frame 23c are attached to a transparent cover 23d by double-sided tape (not illustrated), adhesive, or the like. The cover 23d is mace of a thin sheet-like, film-like, or plate-like synthetic resin material or the like. Through the cover 23d, the touch panel 23a is integrated with the frame 23c. A periphery 23n of the touch panel 23a is located between the frame 23c and the cover 23d. The periphery of the cover 23d is painted black or the like, and prevents the periphery 23n of the touch panel 23a and the frame 23c from being exposed on the side of the front surface 23e of the touch panel unit 23 (upper side in FIG. 16). In the second embodiment also, as illustrated in FIG. 16, there are provided an elastic member 25 having the same function as the elastic member 5 and a sealing member 26 having the same function as the sealing member 6.

As illustrated in FIG. 6, the frame 23c has a rectangular plate-like front wall 23p. In addition, as illustrated in FIG. 9, the frame 23c comprises horizontal portions 23h on both sides in the depth direction and vertical portions 23i on both sides in the width direction as a strip-like portion arranged along the periphery of the touch panel 3a. In the second embodiment, a combining portion 27a that constitutes the slide support mechanisms 27 is provided on a back surface 23f of the front wall 23p of the vertical portions 23i wider than the horizontal portions 23h. In the second embodiment, the combining portion 27a is provided to two positions of each of the two vertical portions 23i, i.e., a total of four positions. In other words, in the second embodiment, the four slide support mechanisms 27 support the touch panel unit 23.

An excitation mechanism 18 is provided on the back surface 23f of the front wall 23p of one of the vertical portions 23i (the vertical portion 23i on the right side in FIG. 9). In the second embodiment, the excitation mechanism 18 comprises a motor 18a and an eccentric weight 18b rotated by the motor 18a. The rotation of the eccentric weight 18b rotated by the motor 18a vibrates (rotates) the gravity center of the excitation mechanism 18. This vibrates the touch panel unit 23 as well as the frame 23c.

As illustrated in FIG. 9, the rotation axis Ar of the eccentric weight 18b of the excitation mechanism 18 extends along a short side 23j of the rectangular touch panel 23a in a front view. Accordingly, the excitation direction of the excitation mechanism 18 is perpendicular to the short side 23j, and the excitation mechanism 18 is capable of vibrating the touch panel unit 23 in the direction along a long side 23k. If the excitation mechanism 18 vibrates the touch panel unit 23 in the direction along the short side 23j, i.e., the Y direction, this increases the distance (i.e., moment arm) between the excitation mechanism 18 and each of the combining portions 27a as a support point of the touch panel unit 23 in the X direction and the variation thereof. Consequently, the touch panel unit 23 is likely to slide in the in-plane direction (i.e., in the XY plane). In this case, the vibration is likely to vary substantially depending on the position of the touch panel 23a. According to the second embodiment, the excitation mechanism 18 vibrates the touch panel unit 23 in the direction perpendicular to the short side 23j, i.e., the direction along the long side 23k. This reduces the distance (i.e., moment arm) between the excitation mechanism 18 and each of the combining portions 27a in the Y direction and the variation thereof. Thus, the touch panel unit 23 is not likely to slide in the in-plane direction (i.e., in the XY plane). In other words, it is possible to easily achieve the vibration of the touch panel 23a along the longitudinal direction (i.e., the X direction) in which slide components are less.

The eccentric weight 18b of the excitation mechanism 18 is located closer to the center of the short side 23j than the motor 18a. This makes the excitation point of the excitation mechanism 18 closer to the gravity center of the touch panel unit 23. Thus, the touch panel unit 23 can be effectively vibrated. Besides, compared to the case where the eccentric weight 18b is located more distant from the center of the short side 23j than the motor 18a, the touch panel unit 23 is not likely to slide in the in-plane direction (i.e., in the XY plane). In other words, it is possible to easily achieve the vibration along the longitudinal direction (i.e., the X direction) in which slide components are less.

As described above, according to the second embodiment, the battery pack 17 is located on the side distant from the hinge mechanism 13 (i.e., on the back side in the depth direction). On the other hand, the excitation mechanism 18 is located close to the hinge mechanism 13 (i.e., on the front side in the depth direction). That is, in the second embodiment, the battery pack 17 and the excitation mechanism 18 are effectively arranged in the housing 22 of the first body 11 without interference with each other.

As illustrated in FIG. 9, the press button mechanism 30 as an operation mechanism is located on the back surface 23f of the front wall 23p of the vertical portions 23i of the frame 23c. In the second embodiment, the press button mechanism 30 is located in the center of the vertical portions 23i in the longitudinal direction (the Y direction), and the combining portions 27a, i.e., the slide support mechanisms 27, are located on both sides of the vertical portions 23l in the longitudinal direction with the press button mechanism 30 between them. The cover 33 as a movable portion of the press button mechanism 30 and the combining portions 27a (i.e., the slide support mechanisms 27) are arranged symmetrical with respect to a center line C passing through the center of the touch panel unit 23 in the X direction along the Y direction. A circuit board 23m mounted with an electronic component for the processing of the touch panel 23a is attached on the back surface 23f of the front wall 23p of the horizontal portions 23h on the hinge mechanism 13 side of the frame 23c. The circuit board 23m is located on the vertical portion 23i opposite (the left side in FIG. 9) the vertical portion 23i provided with the excitation mechanism 18 (the vertical portion 23i on the right side in FIG. 9).

In the second embodiment also, as illustrated in FIGS. 6 and 9, the press button mechanism 30 is provided to each of a pair of the strip-like vertical portions 23i extending along the vertical direction on the left and the right of the frame 3c. The press button mechanism 30 is located between a plurality (two in the first embodiment) of support points of the frame 23c by the slide support mechanisms 27.

Figure 11:
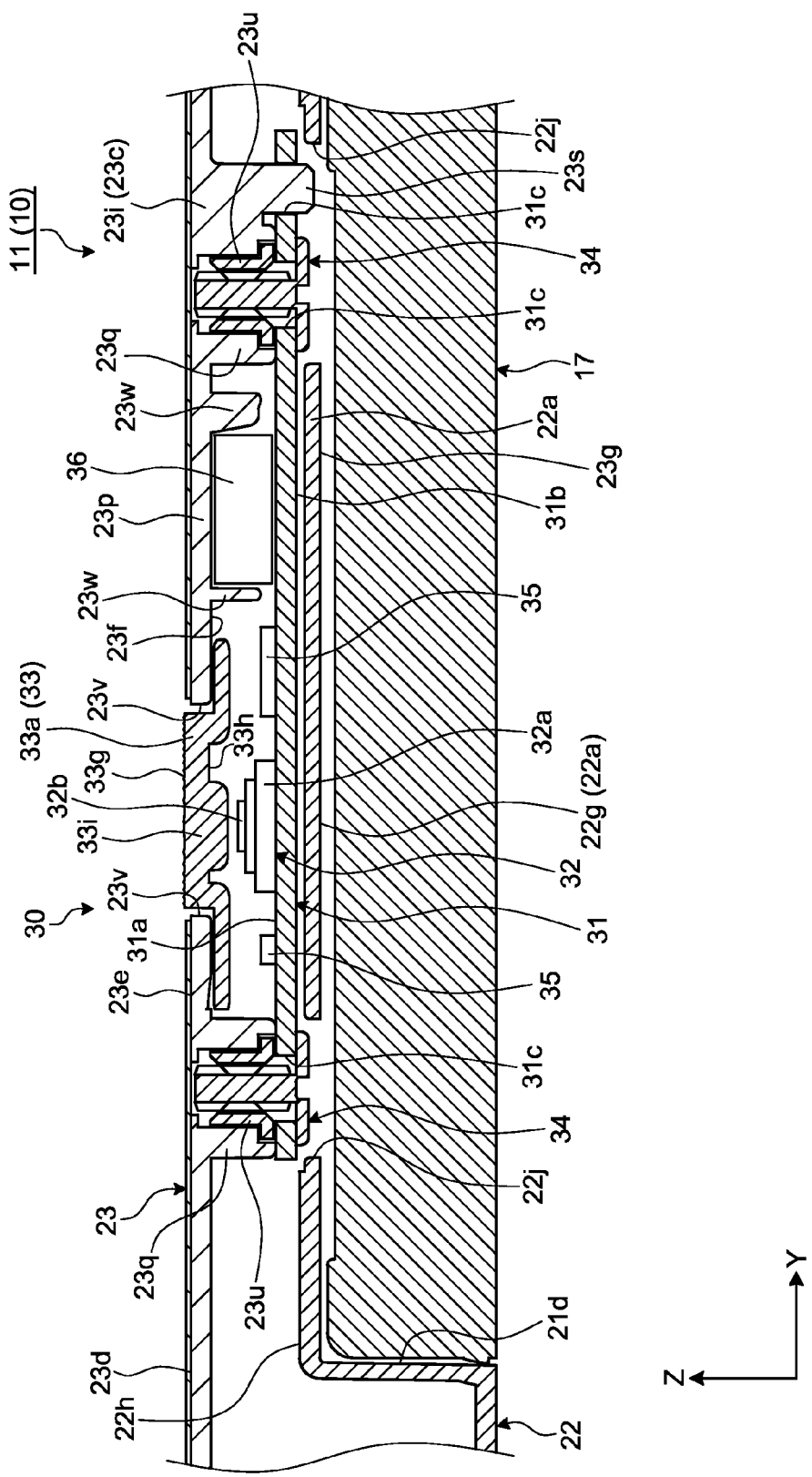
FIG. 11 is an exemplary cross-sectional view taken along line XI-XI of FIG. 6 in the second embodiment.
Figure 12:
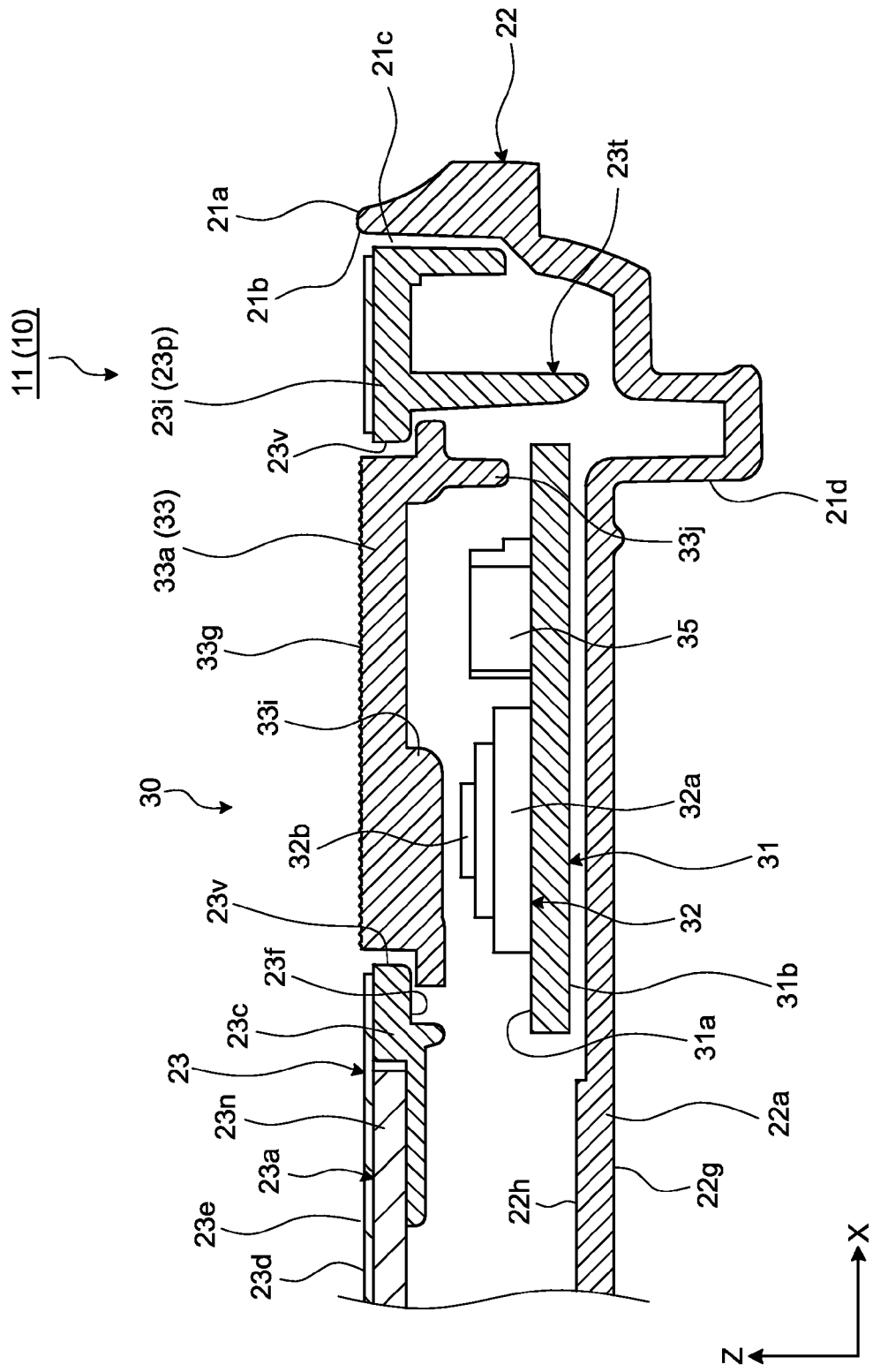
FIG. 12 is an exemplary cross-sectional view taken along line XII-XII of FIG. 6 in the second embodiment.

In the second embodiment also, as illustrated in FIGS. 11 and 12, the press button mechanism 30 comprises the circuit board 31 as an operation mechanism support member, the press button 32 attached to the circuit board 31, and the cover 33 that covers the press button 32.

Figure 10:
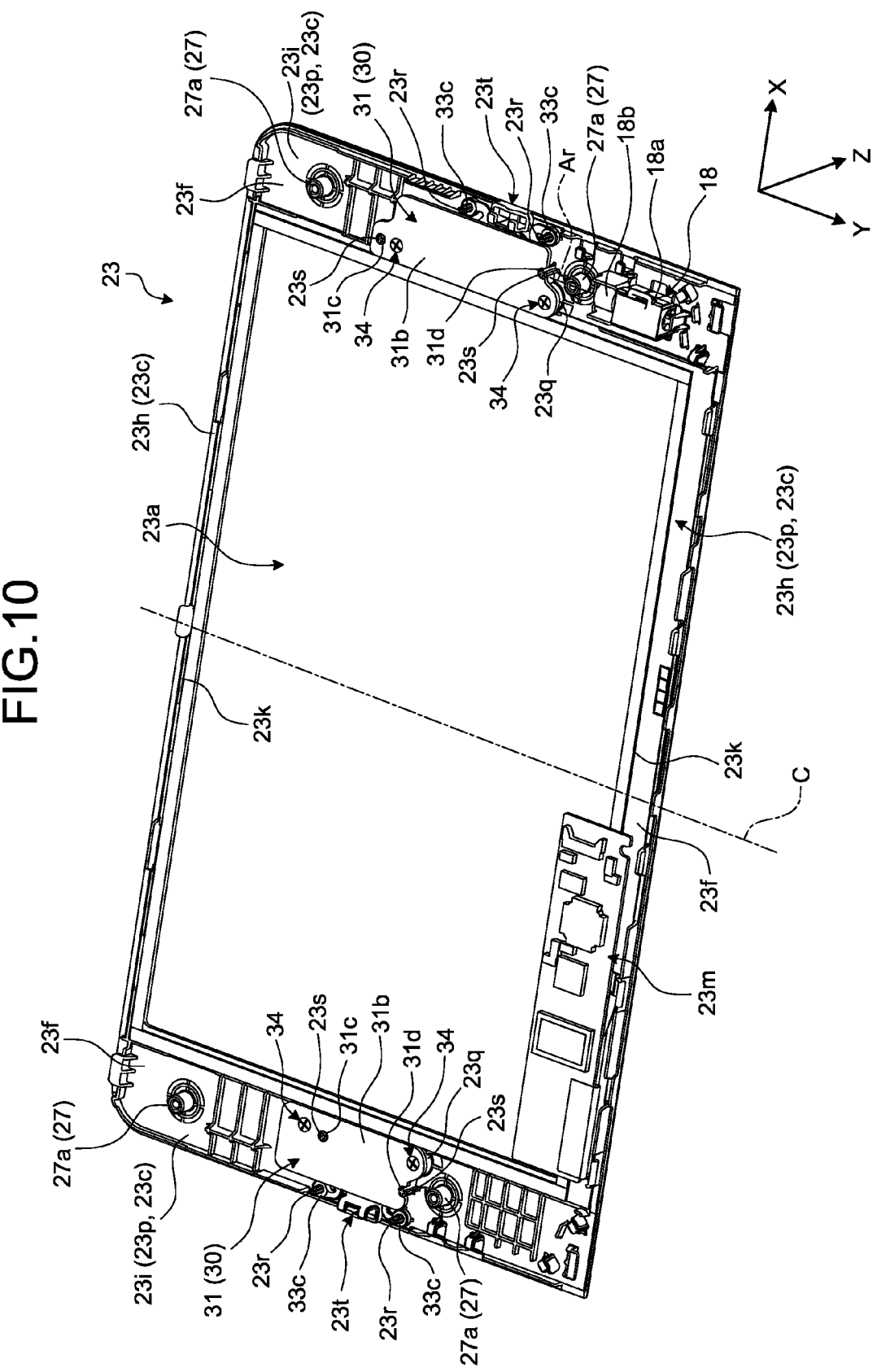
FIG. 10 is an exemplary perspective view of the back of the touch panel unit of the electronic device with the operation mechanism support member in the second embodiment.

In the second embodiment also, as illustrated in FIGS. 10 to 12, the circuit board 31 is located behind the front wall 3p of the frame 3c in parallel thereto with a space therebetween. In other words, the circuit board 31 is arranged such that the front surface 31a faces forward, while the back surface 31b faces backward.

As illustrated in FIGS. 9 and 11, bosses 23q protruding backward are provided to the front wall 23p of the frame 23c as a support member fixing member. The bosses 23q are arranged spaced apart along the periphery 23n of the touch panel 23a (see FIG. 12) at a plurality of positions (in the second embodiment, two positions per the press button mechanism 30). A cylindrical female screw member 23u is attached to each of the bosses 23q by insert molding or the like. The screw 34 passing through the through hole 31c of the circuit board 31 is screwed into the female screw member 23u, thereby the circuit board 31 is fixed to each of the bosses 23q as illustrated in FIG. 10. The front wall 23p is provided with a protrusion 23s protruding backward. The protrusion 23s and the adjacent one of the bosses 23q are integrated via a rib or the like.

Figure 13:
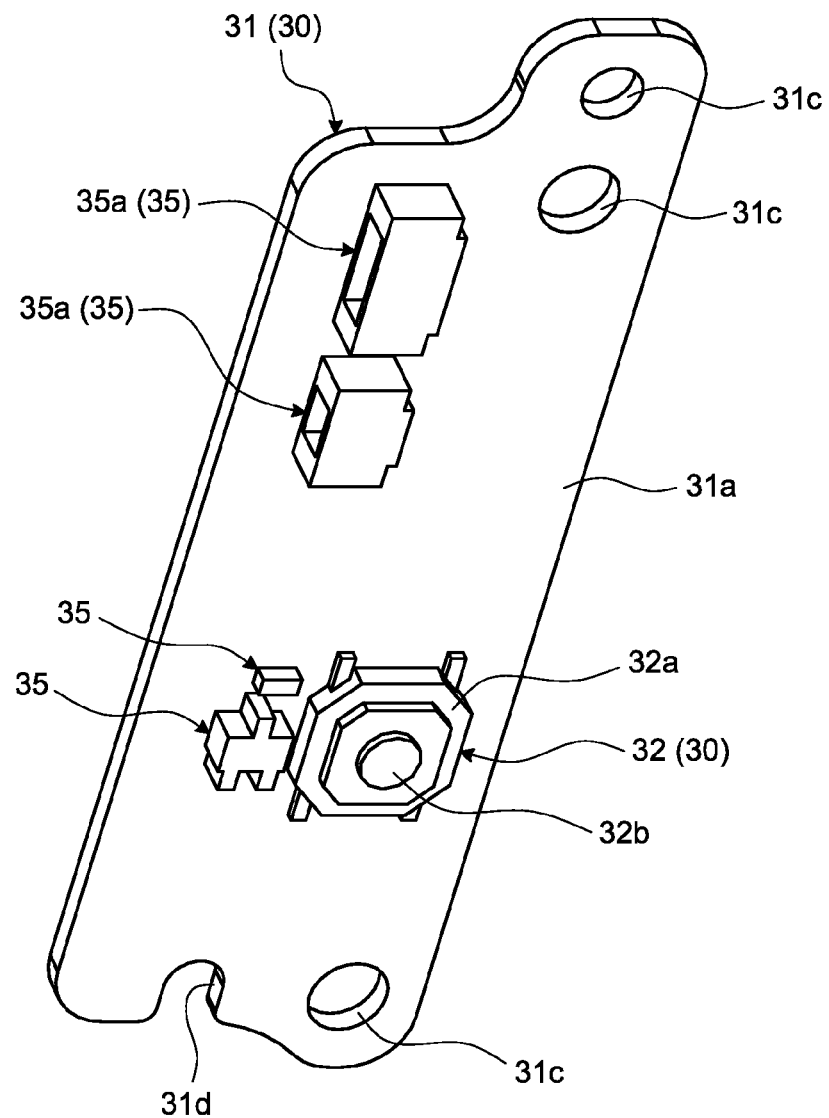
FIG. 13 is an exemplary perspective view of the operation mechanism support member of the electronic device viewed from the front in the second embodiment.

In the second embodiment also, the circuit board 31 is configured as a printed circuit board. As illustrated in FIG. 13, the press button 32, the component 35, and the like are soldered to the front surface 31a of the circuit board 31 facing the back surface 3f of the front wall 3p. The press button 32 is connected to a control circuit including CPU and the like (not illustrated) via a wiring pattern formed on the circuit board 31, a connector 35a as the component 35 mounted on the circuit board 31, harness connected to the connector 35a, and the like (all not illustrated). The protrusion 23s, the through hole 31c that the protrusion 23s passes through, and a notch 31d are formed in the circuit board 31. The protrusion 23s, the through hole 31c that the protrusion 23s passes through, and the notch 31d function as a positioning member of the circuit board 31.

Figure 14:
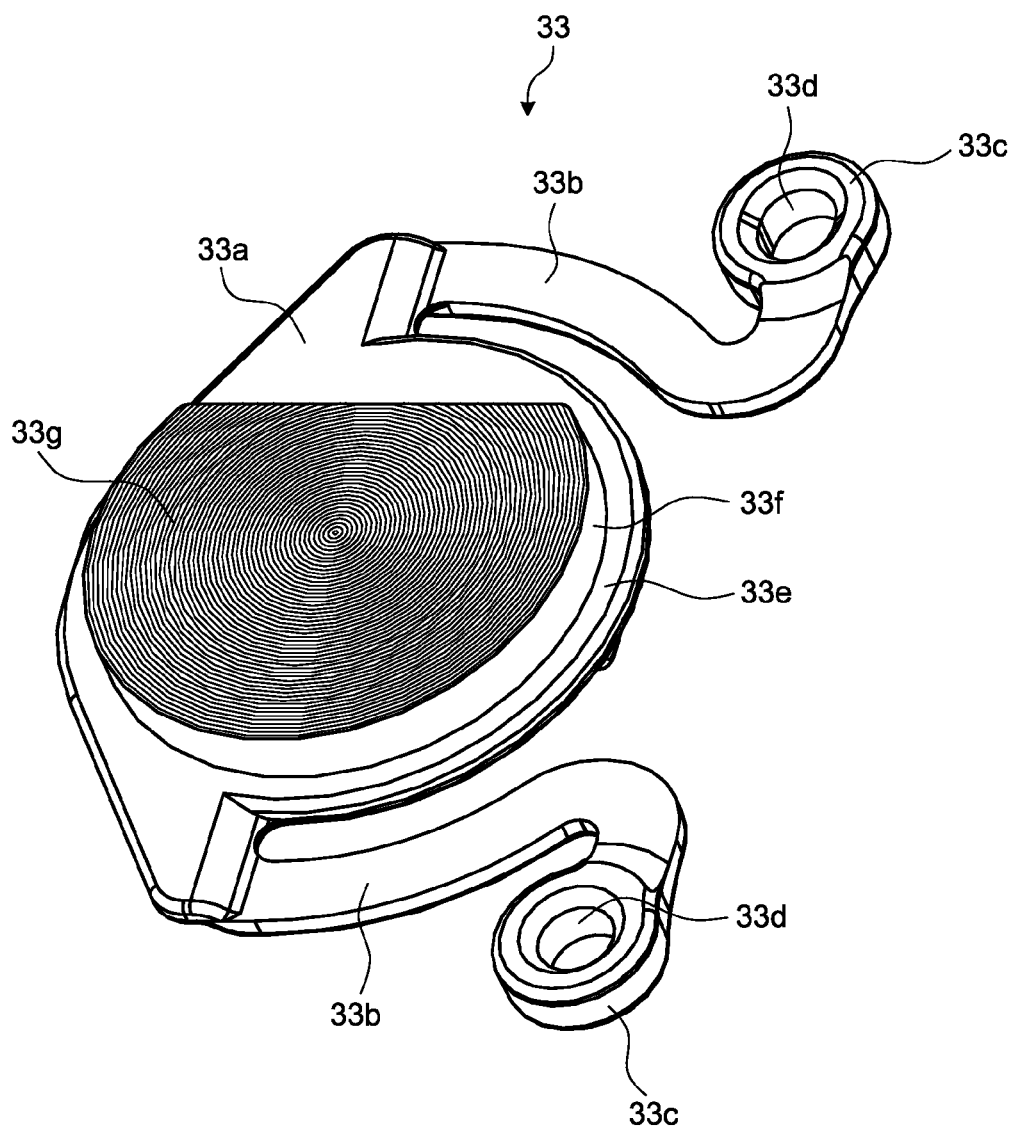
FIG. 14 is an exemplary perspective view of a cover of the electronic device in the second embodiment.
Figure 15A:
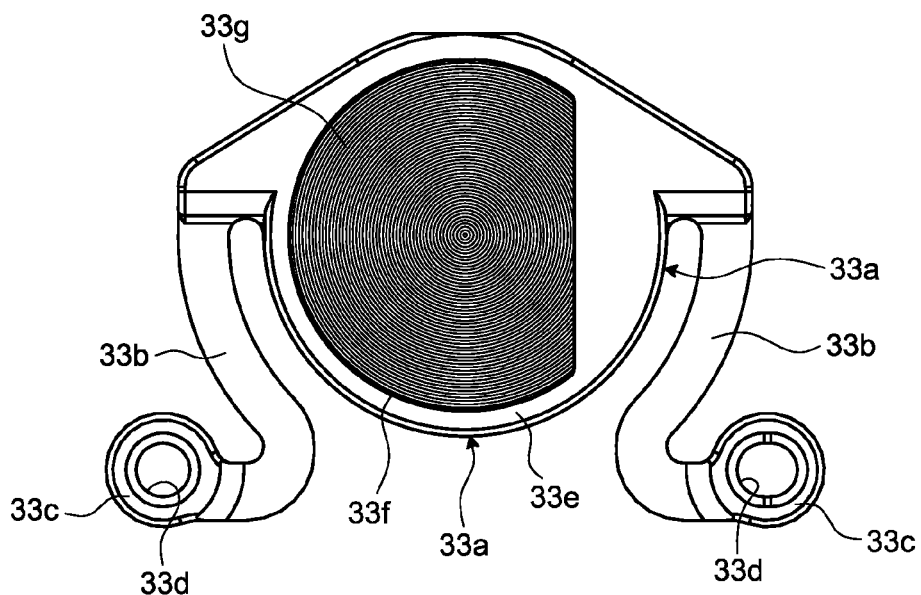
FIG. 15A is an exemplary view of the cover of the electronic device viewed from the front in the second embodiment.
Figure 15B:
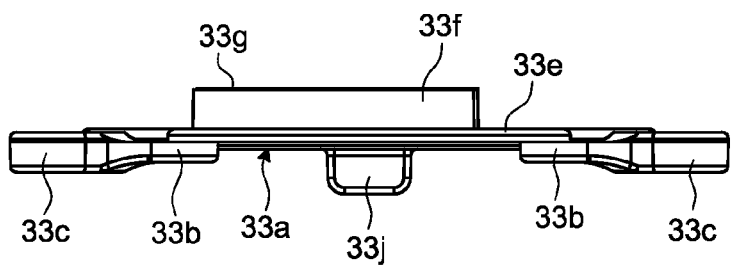
FIG. 15B is an exemplary view of the cover of the electronic device viewed from the side in the second embodiment.

As illustrated in FIGS. 11 and 12, the cover 33 covers the front side of the press button 32 with a space therebetween. The cover 33 is made of an elastic material including elastomer, synthetic resin, and the like. As illustrated in FIGS. 14 and 15, the cover 33 comprises the operation portion 33a, an arm 33b, and a fixing portion 33c. As illustrated in FIGS. 9 and 10, protrusions 23r are provided to the back surface 23f of the front wall 23p as a cover fixing member. While the protrusion 23r is inserted in the through hole 33d of the fixing portion 33c, the fixing portion 33c is fixed to the protrusion 23r and the back surface 23f of the front wall 23p by, for example, welding, adhesion, or the like. Thus, the cover 33 is fixed to the frame 23c. In the second embodiment, the cover 33 is fixed to the frame 23c through the fixing portion 33c at two positions. As illustrated in FIG. 9, the two protrusions 23r respectively corresponding to the two fixing portions 33c are arranged spaced apart along the depth direction of the housing 22 (the Y direction). That is, in the second embodiment, the cover 33 is supported by the frame 23c on both sides in the depth direction of the housing 22 and on one side in the width direction.

The operation portion 33a is formed into a disc-like shape. The arm 33b extends in a strip-like shape between the fixing portion 33c and the operation portion 33a. The arm 33b has a portion extending toward the operation portion 33a from the fixing portion 33c and a portion extending in an arm-like shape along the periphery of the operation portion 33a, which are connected in a V-shape. In this manner, the arm 33b is bent to increase the length thereof, which prevents an increase in the stress applied to the arm 33b. Preferably, such rigidity is maintained with respect to the arm 33b that the operation portion 33a does not move when pressure or the like is not acting on the operation portion 33a and only gravity and predetermined vibration input are acting.

Figure 15C:
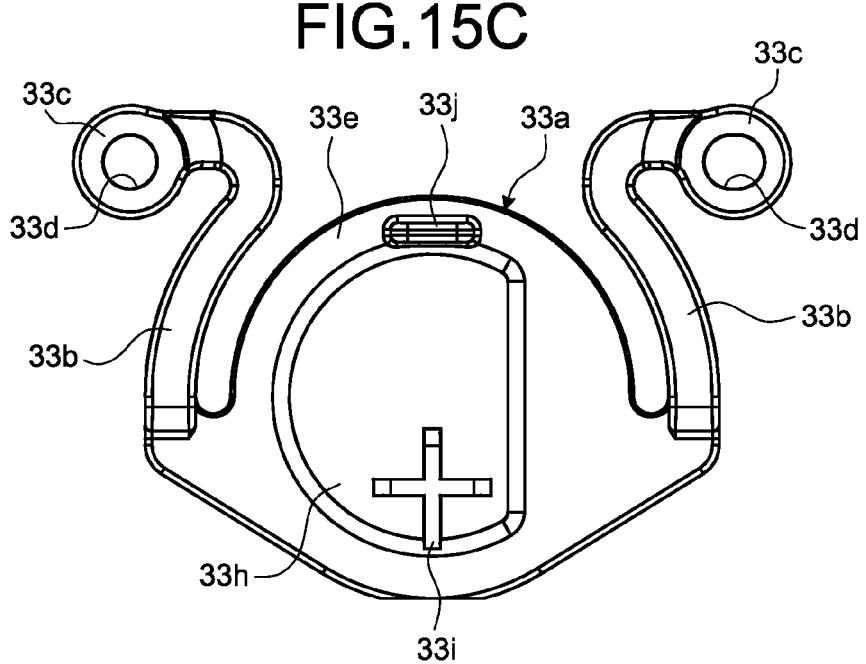
FIG. 15C is an exemplary view of the cover of the electronic device viewed from the back in the second embodiment.

The operation portion 33a comprises a ring-like and plate-like base 33e and a bulge 33f that cylindrically bulges forward from the center of the base 33e as having a D—shaped cross section. A recessed portion is formed in the bulge 33f on the back surface 33h side. The operation portion 33a is provided with the protrusion 331 facing the movable portion 32b and the protrusion 33j facing the front surface 31a of the circuit board 31 at a position distant from the movable portion 32b. As illustrated in FIGS. 11 and 12, when the cover 33 is assembled, the protrusion 331 is located in front of the movable portion 32b of the press button 32 (upper side in FIGS. 11 and 12), and faces the movable portion 32b with a space therebetween. When the cover 33 is pressed backward from the front by the user's finger or the like, the protrusion 33i presses the movable portion 32b. As in the first embodiment, the protrusion 33j comes in contact with the front surface 31a of the circuit board 31 when the user presses the operation portion 33a with his/her finger or the like at a position distant from the press button 32 (for example, the right end of the operation portion 33a in FIG. 12) and constitutes a support post. That is, in the second embodiment also, the protrusion 33j corresponds to an inclination preventing member. As illustrated in FIG. 15C, in the second embodiment, the protrusion 33i has a cross-shaped cross section, which prevents shrinkage upon molding.

As illustrated in FIGS. 11 and 12, a through hole 23v is formed in the front wall 23p. The bulge 33f of the operation portion 33a of the cover 33 passes through the through hole 23v, and is exposed on the front surface 23e side of the touch panel unit 23. In the second embodiment, the top surface 33g of the operation portion 33a and the front surface 23e of the touch panel unit 23 are arranged to be connected with almost no unevenness. When pressed from the front by the user's finger or the like, the cover 33 is warped backward (lower side in FIGS. 4 and 5) as being elastically deformed, and the operation portion 33a is retracted from the front surface 23e. When the press is released, the operation portion 33a returns forward to be in the initial state.

As illustrated in FIG. 9, in the second embodiment, a plurality (in the second embodiment, two) of the bosses 23q are arranged on both sides of the vertical portions 23i as strip-like portions in its extending direction (i.e., the Y direction). This facilitates to reduces the width of the vertical portions 23i.

According to the second embodiment, the bosses 23q are located on one side of the vertical portions 23i in the width direction, while the protrusion 23r is located on the other side in the width direction. With this, the bosses 23q and the protrusion 23r are effectively arranged in the vertical portions 23i, which facilitates to prevent an increase in the size of the touch panel unit 23.

According to the second embodiment, the bosses 23q are located closer to the touch panel 23a than the protrusion 23r. In other words, the circuit board 31 is attached to the base of the vertical portions 23i close to the touch panel 23a and having higher rigidity. Thus, the press button 32 as well as the circuit board 31 can be stably supported with the vertical portions 23i.

In the second embodiment, as illustrated in FIGS. 9 and 10, a protrusion 23t with a hook is provided between a pair of the protrusions 23r on the back surface 23f of the vertical portions 23i to hold the harness. This prevents the harness from interfering with the operation portion 33a and the arm 33b of the cover 33.

In the second embodiment, a magnet 36 is attached as a component to the back surface 23f of the front wall 23p, and the circuit board 31 covers the back side of the magnet 36. The magnet 36 is to be detected by a hall element (not illustrated) as a magnet sensor that detects whether the first body 11 and the second body 12 are in the open or closed position. The hall element is built in the second body 12. The magnet 36 is attached to the back surface 23f of the front wall 23p by adhesion or the like. With this, even when the magnet 36 comes off the back surface 23f for some reason, the circuit board 31 prevents the magnet 36 from moving to another position in the housing 22. A protrusion 23w is provided on the back surface 23f of the front wall 23p. The protrusion 23w regulates the lateral movement of the magnet 36 and functions as a guide for the attachment. The magnet as a component may be attached on the circuit board 31.

As illustrated in FIG. 16, the electronic device 10 of the second embodiment comprises the slide support mechanisms 27 having the same function as the slide support mechanisms 7 of the first embodiment. That is, the slide support mechanisms 27 each comprise the support bracket 22c provided to the housing 22, the elastic bush 28 attached to the support bracket 22c, a through hole 28a formed in the elastic bush 28, the combining portion 27a that passes through the through hole 28a, and a screw 29 configured to be combined with the combining portion 27a as a combined member. In the second embodiment, the support bracket 22c corresponds to a base. The frame 23c corresponds to a periphery member, while the front wall 23p of the frame 23c corresponds to a supported member.

The support bracket 22c is provided as a boss that cylindrically protrudes forward, i.e., toward the front wall 23p, as a supported member at the periphery of the bottom wall 22a of the housing 22. A circular through hole 22e is formed in the center of a top wall 22d of the support bracket 22c. An inward-looking flange 22f is formed around the through hole 22e.

The elastic bush 28 is made of an elastic material such as elastomer (for example, synthetic rubber) or the like, and formed in a cylindrical shape. An outer circumference groove 28c is formed in the center of an outer circumference surface 28b of the elastic bush 28 in the axial direction (the vertical direction in FIG. 16). The outer circumference groove 28c extends all over the outer circumference. The flange 22f of the support bracket 22c is fitted in the outer circumference groove 28c, and thereby the elastic bush 28 is attached to the support bracket 22c.

The elastic bush 28 is elastically deformed. Accordingly, the operator can relatively easily attach the elastic bush 28 to the support bracket 22c by inserting the elastic bush 28 into the through hole 22e from the front side. One side of the elastic bush 28 is asymmetric with the other in the axial direction. This prevents the operator from erroneously assembling the elastic bush 28 with the support bracket 22c. As illustrated in FIG. 16, as with the elastic bush 8 of the first embodiment, tapered surfaces 28d and 28e are formed in the elastic bush 28. Besides, as with the elastic bush 8 of the first embodiment, the elastic bush 28 comprises a front-side extension portion 28f located between the frame 23c and the flange 22f, and a back-side extension portion 28g located between a head 29a of the screw 29 and the flange 22f.

The combining portion 27a is formed as a boss cylindrically protruding backward from the frame 23c. As illustrated in FIG. 16, when assembled, the combining portion 27a passes through the through hole 22e of the support bracket 22c and protrudes on the back side (back surface side) of the support bracket 22c. A female screw hole 27b opening backward is formed in the combining portion 27a as a female screw portion.

The screw 29 comprises the head 29a and a male screw portion 29b configured to be threaded into the female screw hole 27b. The screw 29 is inserted into the combining portion 27a until the head 29a comes in contact with an end 27c of the combining portion 27a.

The operator assembles the elastic bush 28 with the support bracket 22c from the front side, and brings the touch panel unit 23 close to the housing 22 from the front side to inset the combining portion 27a into the through hole 28a of the elastic bush 28. Then, the operator screws the screw 29 into the female screw hole 27b of the combining portion 27a as a boss from the back side, and thereby the slide support mechanisms 27 as illustrated in FIG. 16 are formed. That is, the elastic bush 28 is configured to be fitted with the support bracket 22c. Thus, the operator can perform the assembly work easily and smoothly compared to the case where an elastic member is adhered or screwed.

In the second embodiment, as in the first embodiment, the combining portion 27a passes through the through hole 28a of the elastic bush 28 in the front-back direction of the display panel 24. Besides, in the second embodiment also, when the slide support mechanisms 27 are assembled, the front-side extension portion 28f of the elastic bush 28 is located between the support brackets 2c as part of the housing 22 and the frame 23c of the touch panel unit 23 in front thereof, and also the back-side extension portion 28g of the elastic bush 28 is located between the support bracket 22c and the screw 29 in the back thereof. In addition, the elastic bush 28 is arranged to surround the combining portion 27a. In the second embodiment also, the support bracket 22c is formed as a boss that protrudes forward (i.e., toward the front wall 23p of the frame 23c) from the bottom wall 22a of the housing 22.

The second embodiment also provides a structure that reduces the contact area between the touch panel unit 23 and the elastic bush 28 when assembled. In the structure, a ring-like protrusion 28h is provided on the inner surface of the through hole 28a of the elastic bush 28, and a plurality of protrusions 23g are arranged in a circle at a portion of the back surface 23f of the frame 23c faces the elastic bush 28. These are described by way of example only, and a protrusion may be provided to the combining portion 27a or the front surface of the elastic bush 8, such a protrusion may be formed in a ring shape, or a plurality of protrusions may be arranged in a circle.

As illustrated in FIG. 8, in the second embodiment, the screw 29 that constitutes the slide support mechanisms 27, and the screw 34 and the protrusion 23r that constitute the press button mechanism 30 are exposed on the back surface 22g side of the bottom wall 22a. That is, before screwing the screws 29 and 34, the end 27c (see FIG. 16) of the combining portion 27a that constitutes the slide support mechanisms 27 is exposed on the back surface 22g side of the bottom wall 22a, and also the bosses 23q and the protrusion 23r are exposed via a through hole 22j formed in the bottom wall 22a. Accordingly, by screwing the screws 29 and 34 when the battery pack 17 is not fitted in the recessed portion 21d, the slide support mechanisms 27 and the press button mechanism 30 can be easily and smoothly obtained, and the touch panel unit 23 can be attached to the housing 22. Further, by covering the screws 29 and 34 with the battery pack 17, it is possible to prevent the touch panel unit 23 and the press button mechanism 30 from being detached from the housing 22 caused by the user erroneously unscrewing the screw 29. With this, compared to the case where the cover is separately provided to cover the screws 29 and 34, the structure can be simplified. As illustrated in FIG. 16, a seal 22i may be attached to the back surface 22g as an example of a cover to cover the screws 29 and 34 therewith. Further, in the second embodiment, the housing 22 can be made thinner by using the battery pack 17 as the cover of the recessed portion 21d. Furthermore, the protrusion 23r for positioning the circuit board 31 is exposed via the through hole 22j, which enables the operator to check the installation state of the circuit board 31.

As described above, according to the second embodiment, the electronic device 10 comprises the slide support mechanisms 27 having the same function as the slide support mechanisms 7 of the first embodiment although with different specifications such as the size, number, location, and the like. That is, the electronic device 10 of the second embodiment provided with the slide support mechanisms 27 can achieve the same effect as the television apparatus 1 of the first embodiment provided with the slide support mechanisms 7. Besides, the elastic bush 28 of the slide support mechanisms 27 functions as a preventing member in the same manner as the elastic bush 8 of the slide support mechanisms 7 of the first embodiment functioning as a preventing member.

According to the second embodiment, the electronic device 10 comprises the press button mechanism 30 as an operation mechanism. Thus, it is possible to achieve the same effect as the first embodiment.

According to the second embodiment, a plurality (in the second embodiment, two) of the bosses 23q are arranged on both sides of the vertical portions 23i as strip-like portions in its extending direction (i.e., the Y direction) with the cover 33 between them. The bosses 23q are located on one side of the vertical portions 23i in the width direction, while the protrusion 23r is located on the other side in the width direction. With this, the bosses 23q and the protrusion 23r are effectively arranged, which prevents an increase in the size of the touch panel unit 23 as well as the vertical portions 23i as strip-like portions. Besides, the bosses 23q are located closer to the touch panel 23a than the protrusion 23r. Thus, the circuit board 31 can be stably supported. Further, the magnet 36 is attached as a component on the back surface 23f of the front wall 23p, and the circuit board 31 covers the back side of the magnet 36. That is, the circuit board 31 can be used as a cover for the magnet 36 as a component.

The foregoing embodiments are susceptible to considerable variation in their practice. For example, the embodiments are described above as being applied to the television apparatus or the notebook personal computer provided with two display screens, the embodiments may be applied to any other electronic device having a display panel and a front panel in front of the display panel such as a notebook or desktop computer with one display screen, a personal digital assistant (PDA), a smartbook, a smartphone, a mobile phone, and the like.

Besides, the specifications (motion system, structure, form, material, size, number, arrangement, etc.) can be changed as required for the display device, the electronic device, the display panel, the front panel, the panel unit, the support base, the periphery member, the slide support mechanism, the operation mechanism, the movable portion, the operation mechanism support member, the operation mechanism main body, the through portion, the cover, the support member fixing member, the cover fixing member, the strip-like portion, the component, the elastic bush, the combining portion, the combined member, the frame, the excitation mechanism, the protrusion, and the like. For example, the front panel need not necessarily be a touch panel. In addition, the support base may be a member other than the housing such as, for example, a member that constitutes the basis of the device main body. The periphery member may be provided to part of the periphery of the front panel, and need not necessarily surround the periphery in a frame-like manner. The excitation mechanism may be a mechanism with a linear motor. An element other than the screw, such as a rivet or the like, may be used as the combining portion. Further, using a nut as the combined member, the male screw portion may be provided to the end of the combining portion so that the nut is tightened thereon.

In place of the operation mechanism of the second embodiment, the panel unit may be provided with a combination of an ON/OFF switch such as a wireless local area network (LAN) and a circuit board for the switch, a touch sensor panel and a touch sensor substrate, a touch pad unit and a face sheet, a light-emitting diode (ZED) lens and an LED circuit board, or the like. This structure can achieve the same effect.

The number and location of the operation mechanism can be changed as required. The operation mechanism may be provided to the horizontal portions as strip-like portions. The operation mechanism support member may cover a component other than the magnet.

One of the supporting member and the supported member may comprise an inward-looking flange that extends from the outer circumference of the elastic bush toward the inner circumference, and the elastic bush may be located on the inner circumference side of the inward-looking flange and on both sides in the axial direction (for example, cover while surrounding). Each element integrated with the other of the supporting member and the supported member may be located on the inner circumference side of the elastic bush and on both sides in the axial direction (for example, cover while surrounding). In this case, the elastic bush functions as a preventing member.

Although not illustrated, a portion integrated with one of the supporting member and the supported member may comprise an outward-looking flange that extends toward the outer circumference, and the elastic bush may be located on the outer circumference side of the outward-looking flange and on both sides in the axial direction (for example, cover while surrounding). Each element integrated with the other of the supporting member and the supported member may be located on the outer circumference side of the elastic bush and on both sides in the axial direction (for example, cover while surrounding). In this case also, the elastic bush functions as a preventing member. In addition, the elastic bush may comprise a plurality of divisional bodies.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
a housing;
a display device at least partly housed in the housing and comprising a display screen;
a unit configured to be slidable with respect to the housing and the display device, the unit comprising:
 a panel configured to cover the display screen; and
 a periphery member comprising an operation module configured to receive external operation at a position outside the display screen;
a plurality of slide supports configured to support the periphery member of the unit to be slidable with respect to the housing and the display device, wherein the operation module is positioned between support points of the periphery member by the slide supports, and wherein the slide supports comprise:

an elastic bush comprising a through portion and a periphery attached to one of the housing and the unit; and a combined member configured to be combined with another one of the unit and the housing via a combining portion configured to pass through the through portion and to hold the elastic bush with the other one of the unit and the housing.

2. The electronic device of claim 1, wherein the operation module comprises:

an operation module support member located behind a front wall of the periphery member and spaced from the front wall;

an operation module main body supported by the operation module support member and located behind the front wall; and a cover configured to cover the operation module main body, the cover being configured to pass through a through portion in the front wall and to be exposed on a front side of the periphery member.

3. The electronic device of claim 2, wherein the periphery member comprises:

a plurality of support member fixing members located on both sides of the cover, wherein the operation module support member is configured to be fixed to the support member fixing members; and a cover fixing member configured to fix the cover on a back side of the front wall, wherein the support member fixing members are located opposite the cover fixing member with respect to the cover.

4. The electronic device of claim 3, wherein the front wall comprises a strip-like portion extending along the periphery of the panel, and the support member fixing members are located on both sides of the strip-like portion in an extending direction of the strip-like portion with the cover therebetween.

5. The electronic device of claim 4, wherein the support member fixing members are located on one side of the strip-like portion in a width direction of the strip-like portion, and the cover fixing member is located on another side of the strip-like portion in the width direction.

6. The electronic device of claim 5, wherein the support member fixing members are located closer to the panel than to the cover fixing member.

7. The electronic device of claim 2, further comprising a component attached to the back surface of the front wall, wherein the operation module support member is configured to cover a back side of the component.

8. The electronic device of claim 2, wherein the cover is configured to be attached to the periphery member to be slidable with respect to the housing and the display device, and the cover is configured to be movable relative to the periphery member.

9. The electronic device of claim 1, wherein:

the periphery member comprises a through hole, and the operation module passes through the through hole and exposed on a front surface of the periphery member.

* * * * *